US012342405B2

(12) United States Patent
Ingale et al.

(10) Patent No.: US 12,342,405 B2
(45) Date of Patent: *Jun. 24, 2025

(54) METHOD FOR PERFORMING BEARER TYPE CHANGE OF A PLURALITY OF BEARERS CONFIGURED FOR USER EQUIPMENT

(71) Applicant: SAMSUNG ELECTRONICS CO., LTD., Suwon-si (KR)

(72) Inventors: Mangesh Abhimanyu Ingale, Karnataka (IN); Neha Sharma, Karnataka (IN); Anil Agiwal, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/617,977

(22) Filed: Mar. 27, 2024

(65) Prior Publication Data
US 2024/0237126 A1 Jul. 11, 2024

Related U.S. Application Data

(63) Continuation of application No. 18/142,135, filed on May 2, 2023, now Pat. No. 11,950,313, which is a
(Continued)

(30) Foreign Application Priority Data

| Aug. 11, 2017 | (IN) | 201741028700 |
| Aug. 14, 2017 | (IN) | 201741028922 |
| Aug. 9, 2018 | (IN) | 201842030025 |

(51) Int. Cl.
*H04W 76/20* (2018.01)
*H04W 12/0433* (2021.01)
(Continued)

(52) U.S. Cl.
CPC ....... *H04W 76/20* (2018.02); *H04W 12/0433* (2021.01); *H04W 36/0069* (2018.08);
(Continued)

(58) Field of Classification Search
CPC ..... H04W 76/10; H04W 76/15; H04W 76/16; H04W 76/19; H04W 76/20; H04W 76/30;
(Continued)

(56) References Cited

U.S. PATENT DOCUMENTS

| 10,512,116 B2 | 12/2019 | Chang et al. |
| 10,542,473 B2 | 1/2020 | Fan et al. |

(Continued)

FOREIGN PATENT DOCUMENTS

| CN | 104955064 | 9/2015 |
| CN | 105592549 | 5/2016 |

(Continued)

OTHER PUBLICATIONS

Extended European Search Report for EP Application No. 24167299.7 dated Jul. 4, 2024, 8 pages.
(Continued)

*Primary Examiner* — Kevin D Mew
(74) *Attorney, Agent, or Firm* — NIXON & VANDERHYE P.C.

(57) ABSTRACT

Example embodiments provide a method and system for performing a bearer type change of a plurality of radio bearers configured for a User Equipment (UE) including changing the bearer type of a specific bearer by the network and checking any changes in keys, packet data convergence protocol (PDCP) termination point, or PDCP version change. Furthermore, the UE is notified to change the bearer type either through a reconfiguration procedure without handover, a secondary node (SN) change procedure or reconfiguration procedure with handover, or a SN change
(Continued)

procedure. The network indicates one or more operations to the UE for performing the bearer type change.

6 Claims, 20 Drawing Sheets

Related U.S. Application Data continuation of application No. 17/539,346, filed on Dec. 1, 2021, now Pat. No. 11,678,396, which is a continuation of application No. 16/636,823, filed as application No. PCT/KR2018/009275 on Aug. 13, 2018, now Pat. No. 11,483,891.

(51) Int. Cl.
    *H04W 36/00*     (2009.01)
    *H04W 76/16*     (2018.01)
    *H04W 80/02*     (2009.01)

(52) U.S. Cl.
    CPC ..... *H04W 36/00698* (2023.05); *H04W 76/16* (2018.02); *H04W 80/02* (2013.01)

(58) Field of Classification Search
    CPC ......... H04W 36/0055; H04W 36/0066; H04W 36/0069; H04W 12/0433; H04W 80/02
    See application file for complete search history.

(56) References Cited

U.S. PATENT DOCUMENTS

| | | | |
|---|---|---|---|
| 10,863,513 | B2 | 12/2020 | Xiao et al. |
| 11,038,859 | B2 | 6/2021 | Van Der Velde |
| 11,057,814 | B2 | 7/2021 | Zhang |
| 11,057,958 | B2 | 7/2021 | Xiao |
| 11,483,891 | B2 | 10/2022 | Ingale et al. |
| 11,678,396 | B2 | 6/2023 | Ingale et al. |
| 2008/0305817 | A1 | 12/2008 | Namekata |
| 2014/0056243 | A1 | 2/2014 | Pelletier et al. |
| 2014/0321263 | A1 | 10/2014 | Wu |
| 2015/0139192 | A1 | 5/2015 | Zhang |
| 2015/0173120 | A1 | 6/2015 | Yamada |
| 2015/0181473 | A1 | 6/2015 | Horn et al. |
| 2015/0215826 | A1 | 7/2015 | Yamada |
| 2015/0223212 | A1 | 8/2015 | Der Velde et al. |
| 2015/0264621 | A1 | 9/2015 | Sivanesan et al. |
| 2015/0271726 | A1 | 9/2015 | Kim et al. |
| 2016/0014647 | A1 | 1/2016 | Yi |
| 2016/0029245 | A1 | 1/2016 | Hong et al. |
| 2016/0044639 | A1 | 2/2016 | Yi |
| 2016/0135095 | A1 | 5/2016 | Wu |
| 2016/0212661 | A1 | 7/2016 | Basu Mallick et al. |
| 2016/0226632 | A1 | 8/2016 | Zhang et al. |
| 2016/0255675 | A1 | 9/2016 | Van Lieshout et al. |
| 2016/0262066 | A1 | 9/2016 | Ozturk et al. |
| 2016/0277992 | A1 | 9/2016 | Cao |
| 2016/0309389 | A1 | 10/2016 | Laraqui et al. |
| 2016/0316508 | A1 | 10/2016 | Hong et al. |
| 2016/0366175 | A1 | 12/2016 | Basu Mallick et al. |
| 2017/0013668 | A1 | 1/2017 | Chang et al. |
| 2017/0111832 | A1 | 4/2017 | Wen et al. |
| 2017/0171905 | A1 | 6/2017 | Uchino et al. |
| 2017/0215225 | A1 | 7/2017 | Yi et al. |
| 2017/0222876 | A1 | 8/2017 | Van Der Velde |
| 2017/0230780 | A1 | 8/2017 | Chincholi et al. |
| 2017/0230873 | A1 | 8/2017 | Baek et al. |
| 2017/0331577 | A1 | 11/2017 | Parkvall |
| 2018/0049091 | A1 | 2/2018 | Wang |
| 2018/0049214 | A1 | 2/2018 | Kubota |
| 2018/0083688 | A1 | 3/2018 | Agiwal |
| 2018/0092085 | A1 | 3/2018 | Shaheen |
| 2018/0092146 | A1 | 3/2018 | Hong et al. |
| 2018/0213456 | A1 | 7/2018 | Jheng |
| 2018/0220336 | A1 | 8/2018 | Hong |
| 2018/0270679 | A1 | 9/2018 | Laselva |
| 2018/0270682 | A1 | 9/2018 | Zacharias |
| 2018/0270700 | A1* | 9/2018 | Babaei ............... H04W 28/0278 |
| 2018/0270791 | A1* | 9/2018 | Park ...................... H04W 68/04 |
| 2018/0279229 | A1* | 9/2018 | Dinan ................. H04W 52/281 |
| 2018/0279375 | A1* | 9/2018 | Jeon ....................... H04W 72/23 |
| 2018/0324663 | A1* | 11/2018 | Park ....................... H04W 36/22 |
| 2018/0352556 | A1 | 12/2018 | Loehr |
| 2019/0053292 | A1 | 2/2019 | Ali |
| 2019/0097874 | A1 | 3/2019 | Zhou |
| 2019/0132778 | A1 | 5/2019 | Park |
| 2019/0159274 | A1 | 5/2019 | Hong et al. |
| 2019/0166646 | A1 | 5/2019 | Shih |
| 2019/0174571 | A1 | 6/2019 | Deenoo |
| 2019/0215048 | A1 | 7/2019 | Cirik |
| 2019/0215721 | A1 | 7/2019 | Tang |
| 2019/0380128 | A1 | 12/2019 | Park |
| 2020/0178327 | A1 | 6/2020 | Jiang |
| 2020/0275519 | A1 | 8/2020 | Sharma |
| 2020/0305225 | A1 | 9/2020 | Zhang |
| 2020/0336954 | A1* | 10/2020 | Park ....................... H04W 80/02 |
| 2020/0337107 | A1* | 10/2020 | Mildh ................... H04W 76/22 |
| 2020/0374690 | A1 | 11/2020 | Yao |
| 2020/0374961 | A1 | 11/2020 | Ingale |
| 2021/0211947 | A1* | 7/2021 | Agiwal ................. H04W 72/23 |
| 2022/0201574 | A1* | 6/2022 | Tsuboi .................. H04W 76/19 |
| 2022/0286881 | A1* | 9/2022 | Orsino ................. H04W 76/14 |
| 2023/0262823 | A1 | 8/2023 | Madhurapantula |

FOREIGN PATENT DOCUMENTS

| | | |
|---|---|---|
| CN | 105684491 | 6/2016 |
| CN | 105917727 | 8/2016 |
| CN | 105992288 | 10/2016 |
| CN | 106031229 | 10/2016 |
| CN | 106063360 | 10/2016 |
| CN | 106231637 | 12/2016 |
| CN | 106304399 | 1/2017 |
| CN | 106537882 | 3/2017 |
| CN | 107018542 | 8/2017 |
| EP | 3072351 | 9/2016 |
| EP | 3100578 | 11/2021 |
| KR | 10-2015-0086171 | 7/2015 |
| KR | 2016-0119426 | 10/2016 |
| KR | 10-2016-0128400 | 11/2016 |
| KR | 10-2017-0041658 | 4/2017 |
| WO | 2015/047051 | 4/2015 |
| WO | 2015/064931 | 5/2015 |
| WO | 2015/065080 | 5/2015 |
| WO | 2016/122814 | 8/2016 |
| WO | 2017/014802 | 1/2017 |
| WO | 2017/135666 | 8/2017 |
| WO | 2017/198898 | 11/2017 |
| WO | 2019/031948 | 2/2019 |

OTHER PUBLICATIONS

U.S. Appl. No. 18/142,135, filed May 2, 2023, Ingale et al.
"3GPP; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36 300, Jun. 2017, 331 pages.
"3GPP. Technical Specification Group Radio Access Network; Evolved Universal Terrestrial Radio Access (E-UTRA) and NR; Multi-connectivity; Stage 2 (Release 15)", 3GPP TS 37.340 V0.2.1, Aug. 2017, 43 pages.
"3GPP; TSGRAN; E-UTRA and E-UTRAN; Overall description; Stage 2 (Release 14)", 3GPP TS 36.300 V14.3.0, Jun. 23, 2017, 332 pages.
Huawei et al., "Design for harmonized bearer type", R2-1707402, 3GPP TSG RAN WG2 Meeting Ad hoc, Qingdao, China, Jun. 17, 2017, 6 pages.
Huawui et al., "Discussion of procedural specification for bearer type change in DC", R2-144124, 3GPP TSG RAN WG2 Meeting #87bis, Sep. 27, 2014, 14 pages.

(56) References Cited

OTHER PUBLICATIONS

Samsung, "Inter-RAT Mobility for EN-DC", R2-1707089, 3GPP TSG RAN WG2 NR_AdHoc#2, Qingdao, China, Jun. 17, 2017, 5 pages, http://www.3gpp.org/ftp/TSG_RAN/WG2_RL2/TSG2_AHs/2017_06_NR/Docs/.
Samsung, "Lossless PDCP version change between LTE and NR", R2-1709028, 3GPP TSG RAN WG2 Meeting #99, Berlin, Germany, Aug. 12, 2017, 5 pages, http://www.3gpp.org/ftp/TSG_RAN/WG2_RL2/TSG2_99/Docs/.
Zte et al., "Consideration on the bearer type harmonization", R2-1706980, 3GPP TSG RAN WG2 NR_AdHoc#2, Qingdao, China, Jun. 17, 2017, 38 pages, http://www.3gpp.org/ftp/TSG_RAN/WG2_RL2/TSGR2_AHs/2017_06_NR/Docs/.
International Search Report and Written Opinion of the ISA for PCT/KR2018/009275 dated Nov. 20, 2018, 10 pages.
International Search Report and Written Opinion of the ISA for PCT/KR2018/009274 dated Nov. 22, 2018, 10 pages.
Extended Search Report dated May 7, 2020 in European Patent Application No. 18843561.4.
Extended Search Report dated May 18, 2020 in European Patent Application No. 18842954.2.
"3rd Generation Partnership Project; Technical Specification Group Radio Access Network; Evolved Universal Terrestrial Radio Access (E-UTRA); Radio Resource Control (RRC); Protocol specification (Release 14)", 3GPP Standard; Technical Specification; 3GPP TS 36.331, 3rd Generation Partnership Project (3GPP), Mobile Competence Centre; Sophia-Antipolis Cedex, France, vol. RAN WG2, No. V14.3.0, Jul. 13, 2017, pp. 1-745.
Huawei (Rapporteur): "Summary of [97bis#12] Bearer type change (Huawei)," 3GPP draft; R2-1705155 Summary of 97bis#12NR Bearer Type Change (Huawei), 3rd Generation Partnership Project (3GPP), Mobile Competence Centre; Sophia-Antipolis Cedex, France, vol. RAN WG2, No. Hangzhou, China; May 15, 2017-May 19, 20187, May 14, 2017, 27 pages.
Ericsson: "Bearer type switching in dual connectivity", 3GPP draft; R2-1706572—Bearer Type Switching in NR, 3rd Generation Partnership Project (3GPP), Mobile Competence Centre; Sophia-Antipolis Cedex, France, vol. RAN WG2, No. Qingdao, China; Jun. 27, 2017-Jun. 29, 2017, Jun. 26, 2017, 6 pages.
International Search Report and Written Opinion of the International Searching Authority for PCT/KR2018/011657 dated Jan. 2, 2019, 10 pages.
Extended European Search Report for EP Application No. 18862035.5 dated Sep. 16, 2020, 7 pages.
Office Action for KR Application No. 10-2020-7012731 dated Nov. 25, 2020 and English translation, 10 pages.
Vivo, "Layer-2 behaviors of PDCP duplication activation deactivation" R2-1708508, 3GPP TSG-RAN WG2 Meeting #99, Berlin, Germany, Aug. 12, 2017, 5 pages.
Huawei et al., "PDCP SN Reconfiguration" R2-1702587, 3GPP TSG-RAN WG2 Meeting #97bis, Spokane, USA, Mar. 25, 2017, 8 pages.
Intel Corporation, "RRC Connection Reconfiguration for MR-DC and NR-NR DC" R2-1708831, 3GPP TSG-RAN WG2 Meeting #99, Berlin, Germany, Aug. 20, 2017, 7 pages.
Huawei et al., "DRB configuration and switch in dual connectivity" R2-143343, 3GPP TSG RAN WG2 Meeting #87, Dresden, Germany, Aug. 17, 2014, 5 pages.
First Office Action for CN Application No. 201880052072.7 issued Jun. 25, 2021 and English translation, 24 pages.
Office Action for EP Application No. 18862035.5 dated Jun. 14, 2022, 7 pages.
3GPP TS 36.300 V14.4.0 Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Sep. 2017, 329 pages.
First Office Action for CN Application No. 201880052222.4 dated Feb. 15, 2023 and English translation, 14 pages.
Office Action for EP Application No. 18843561.4 dated Dec. 23, 2022, 6 pages.
First Office Action for CN Application No. 201880077365.0 dated Feb. 27, 2023 and English translation, 10 pages.
Intention to Grant for EP Application No. 18862035.5 dated Jan. 23, 2023, 72 pages.
Notice of Allowance for CN Application No. 201880052222.4 dated Jul. 19, 2023, 4 pages.
Summons to attend oral proceedings for EP Application No. 18843561.4 dated Jul. 4, 2023, 8 pages.
Office Action for CN Application No. 201880077365.0 dated Jul. 31, 2023 and English translation, 10 pages.
Ericsson, "Bearer type switching in dual connectivity" R2-1700909, 3GPP TSG-RAN WG2 #97, Athens, Greece, Feb. 13-17, 2017, 4 pages.
Notice of Allowance for EP Application No. 18843561.4 dated Nov. 27, 2023, 88 pages.
Notice of Allowance for EP Application No. 18862035.5 dated Mar. 5, 2024, 70 pages.
Extended European Search Report for EP Application No. 24190404.4 dated Oct. 29, 2024, 13 pages.
Office Action dated Mar. 13, 2024 for U.S. Appl. No. 18/346,040, 9 pages.
Notice of Allowance dated Aug. 30, 2024 for U.S. Appl. No. 18/346,040, 21 pages.

\* cited by examiner

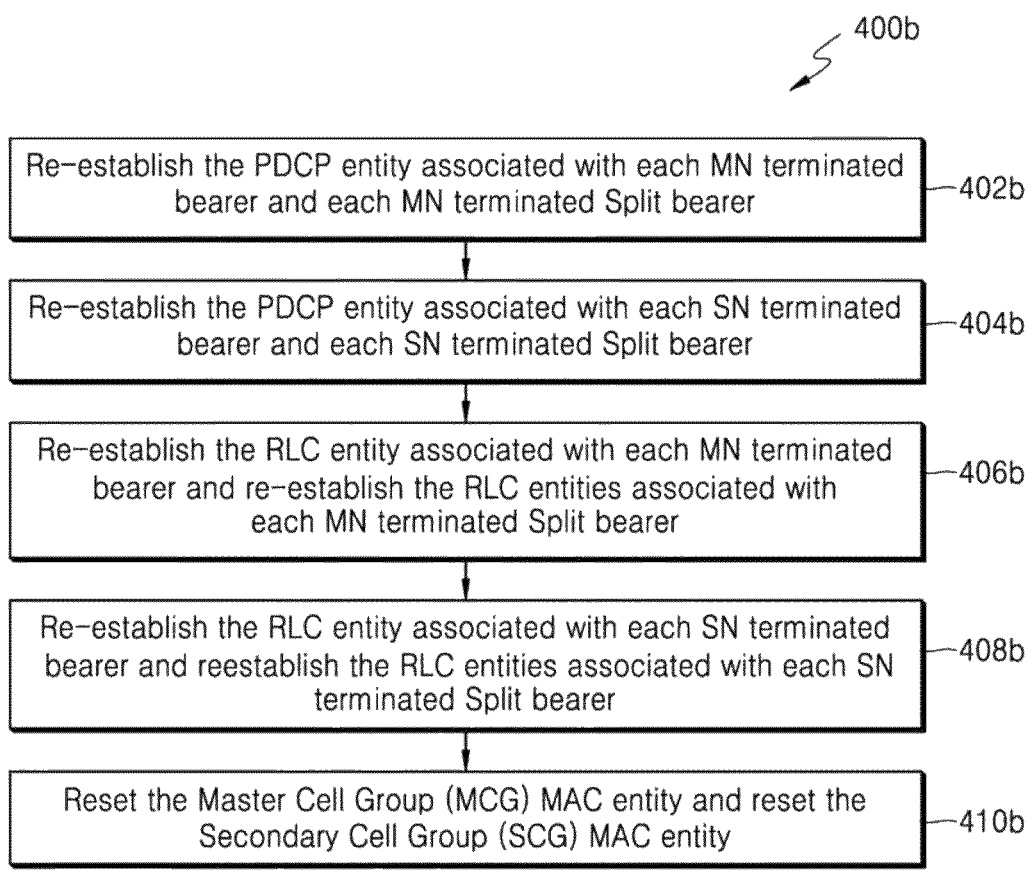

METHOD FOR PERFORMING BEARER TYPE CHANGE OF A PLURALITY OF BEARERS CONFIGURED FOR USER EQUIPMENT

CROSS-REFERENCE TO RELATED APPLICATIONS

This application is a continuation of U.S. application Ser. No. 18/142,135 filed May 2, 2023, which is a continuation of U.S. application Ser. No. 17/539,346 filed Dec. 1, 2021 (now U.S. Pat. No. 11,678,396), which is a continuation of U.S. application Ser. No. 16/636,823 filed Feb. 5, 2020 (now U.S. Pat. No. 11,483,891), which is the U.S. national phase of International Application No. PCT/KR2018/009275 filed Aug. 13, 2018 which designated the U.S. and claims priority to IN Patent Application No. 201741028700 filed Aug. 11, 2017, IN Patent Application No. 201741028922 filed Aug. 14, 2017, and IN Patent Application No. 201842030025 filed Aug. 9, 2018, the entire contents of each of which are hereby incorporated by reference.

TECHNICAL FIELD

The present invention relates to a wireless communication network. More particularly it is related to a method and system for bearer type change of a plurality of radio bearers configured for a User Equipment (UE).

BACKGROUND

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The fifth generation wireless communication system will be implemented not only in lower frequency bands but also in higher frequency (mm Wave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IOT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fourth generation wireless communication systems, the UE in a connected state communicates with an Enhanced Node B (eNB). A radio protocol stack for communication between the UE and the eNB comprises of Packet Data Convergence Protocol (PDCP), Radio link control (RLC), a Medium Access Control (MAC) and Physical (PHY) sub layers. One or more data radio bearers (DRBs) are established between the UE and the eNB for exchanging user plane packets. Each DRB is associated with one PDCP entity and one or more RLC entities. Each DRB is associated with a logical channel in the MAC sub layer. There is one MAC entity in the UE for the eNB.

The main services and functions of the MAC sublayer include: mapping between logical channels and transport channels, Multiplexing/de-multiplexing of MAC SDUs belonging to one or different logical channels into/from transport blocks (TB) delivered to/from the physical layer on the transport channels, scheduling information reporting, error correction through HARQ, priority handling between the logical channels of one UE, priority handling between the UEs by means of dynamic scheduling, transport format selection and padding.

The main services and functions of the RLC sublayer include: transfer of upper layer PDUs, error correction through ARQ (only for Acknowledged Mode (AM) data transfer), concatenation, segmentation and reassembly of RLC SDUs (only for Un-acknowledgement Mode (UM) and AM data transfer), re-segmentation of the RLC data PDUs (only for the AM data transfer), reordering of the RLC data PDUs (only for the UM and AM data transfer), duplicate detection (only for the UM and AM data transfer), protocol error detection (only for the AM data transfer), the RLC SDU discard (only for the UM and AM data transfer), and RLC re-establishment.

Functions of the RLC sub layer are performed by the RLC entities. The RLC entity can be configured to perform the data transfer in one of the following three modes: Transparent Mode (TM), Unacknowledged Mode (UM), and Acknowledged Mode (AM). Consequently, the RLC entity is categorized as a TM RLC entity, an UM RLC entity and an AM RLC entity depending on the mode of data transfer that the RLC entity is configured to provide. The TM RLC entity is configured either as a transmitting TM RLC entity or a receiving TM RLC entity. The transmitting TM RLC entity receives RLC SDUs from an upper layer (i.e. PDCP) and sends RLC PDUs to its peer receiving the TM RLC entity via lower layers (i.e. MAC). The receiving TM RLC entity delivers the RLC SDUs to the upper layer (i.e. PDCP) and receives the RLC PDUs from its peer transmitting the TM RLC entity via the lower layers (i.e. MAC).

Further, the UM RLC entity is configured either as a transmitting UM RLC entity or a receiving UM RLC entity. The transmitting UM RLC entity receives the RLC SDUs from the upper layer and sends the RLC PDUs to its peer receiving UM RLC entity via the lower layers. The receiving UM RLC entity delivers the RLC SDUs to the upper layer and receives the RLC PDUs from its peer transmitting the UM RLC entity via the lower layers. The AM RLC entity consists of a transmitting side and a receiving side. The transmitting side of the AM RLC entity receives the RLC SDUs from the upper layer and sends the RLC PDUs to its peer AM RLC entity via the lower layers. The receiving side of the AM RLC entity delivers the RLC SDUs to the upper layer and receives the RLC PDUs from its peer AM RLC entity via the lower layers.

The main services and functions of the PDCP sublayer for the user plane include: header compression and decompression: ROHC only, transfer of user data, in-sequence delivery of the upper layer PDUs at PDCP re-establishment procedure for RLC AM, For split bearers in the DC (only support for the RLC AM): PDCP PDU routing for transmission and PDCP PDU reordering for reception, duplicate detection of the lower layer SDUs at the PDCP re-establishment procedure for the RLC AM, retransmission of the PDCP SDUs at handover and, for split bearers in DC, of PDCP PDUs at PDCP data-recovery procedure, for RLC AM, ciphering and deciphering, and timer-based SDU discard in an uplink (UL). Functions of the PDCP sub layer are performed by the PDCP entities. Each PDCP entity carries the data of one radio bearer. Due to the UE mobility, the UE may handover from one eNB to another eNB. In dual connectivity (DC) I operation due to UE mobility the UE may handover from one MeNB to another MeNB or SCG change from one SeNB to another SeNB. The eNB may support multiple cells and the UE may also handover from one cell to another cell of same eNB.

In the fourth generation wireless communication system like LTE, the X2 based handover between two enhanced node B (eNBs) or base station for AM data radio bearers (DRBs) is lossless.

After the handover, the user plane protocols for the DRBs configured with the RLC layer in the AM mode are handled as follows in a legacy system: a PDCP SN is maintained on a bearer basis; a source eNB informs the target eNB about the next DL PDCP SN to allocate to a packet which does not have a PDCP sequence number yet (either from the source eNB or from a serving gateway); For security synchronization, a Hyper Frame Number (HFN) is also maintained; the source eNB provides to the target one reference HFN for the UL and one for the DL i.e., HFN and corresponding SN; Security keys are refreshed; the UE sends PDCP status report to the target eNB if the PDCP status report is configured by the target eNB. The configuration to send status report is per bearer; the target eNB may send the PDCP status report to the UE and the UE does not need to wait to resume UL transmission; the UE re-transmits in the target eNB or the target cell, all uplink PDCP SDUs starting from the first PDCP SDU following the last consecutively confirmed PDCP SDU i.e., the oldest PDCP SDU that has not been acknowledged at the RLC in the source, excluding the PDCP SDUs of which the reception is acknowledged through the PDCP SN based reporting by the target eNB. The target eNB re-transmits and prioritizes all downlink PDCP SDUs forwarded by the source eNB (i.e., the target eNB should send data with the PDCP SNs from X2 before sending data from S1), with the exception of the PDCP SDUs of which the reception is acknowledged through the PDCP SN based reporting by the UE; the ROHC is reset; and the RLC/MAC is reset. The PDCP PDUs stored in the PDU reordering buffer are deciphered and decompressed and kept in the PDCP, associated with COUNT.

Alternately, after the handover the user plane protocols for DRBs configured with RLC in the UM mode are handled as follows in legacy system: the PDCP SN is reset; the HFN is reset; the security keys are refreshed; No PDCP status report is transmitted; No PDCP SDUs are retransmitted in the target eNB; The UE PDCP entity does not attempt to retransmit any PDCP SDU in the target cell for which transmission had been completed in the source cell. Instead UE PDCP entity starts the transmission with other PDCP SDUs; ROHC is reset; and RLC/MAC is reset. The user plane protocol of LTE from UE perspective is shown in FIG. 1A.

In the fifth generation wireless communication system, the concept of QoS flows replacing the EPS bearer concept in the core network is introduced. This means the user plane between the gNB and the gateway is based on the QoS flow instead of the S1-U bearer in the LTE system. For the particular UE, there can be one or more QoS flows between the gNB and the data gateway depending on the characteristics of the application/service and the QoS handling of the traffic. The EPS bearer handles all the user packets mapped to the EPS bearer with the same QoS. Within the EPS bearer, there is no further differentiated handling of the user plane packets. The QoS flow concept of the 5G system overcomes this drawback of the EPS bearer concept of the LTE system. The packets mapped to the different QoS flows belonging to the UE traffic can be handled differently. To achieve the same differentiated handling in the LTE system, multiple EPS bearers with different QoS parameters need to be created. In the 5G system, all the different QoS flows of the UE are handled by the PDU session between the g/NB and the data gateway. The UE may have more than one PDU session depending on the number of the PDN connections. However, for one PDN connection one PDU session is created. At high level, the PDU session can be analogous with the EPS bearer in the LTE system.

However, on the radio interface, the 5G system has retained the data radio bearer (DRB) concept for user plane handling. This requires that the one or more QoS flows belonging to the PDU session of the UE is mapped to the DRB depending on the QoS requirement. The mapping of the QoS flow to the DRB is done in the RAN node i.e. the gNB within the new user plane protocol layer called SDAP (Service Data Adaptation Protocol) layer which is placed above the PDCP. The SDAP entities are located in the SDAP sublayer. Several SDAP entities may be defined for the UE. There is the SDAP entity configured per cell group for each individual PDU session. The SDAP entity in the SDAP sublayer performs mapping between the QoS flow and the data radio bearer for both the DL and the UL. The user plane protocol of 5G from UE perspective is shown in FIG. 1B respectively.

Multi-RAT Dual Connectivity (MR-DC) is a generalization of the Intra-E-UTRA Dual Connectivity (DC) described in 3GPP TS 36.300, where a multiple Rx/Tx UE may be configured to utilize radio resources provided by two distinct schedulers in two different nodes connected via non-ideal backhaul, one providing E-UTRA access and the other one providing NR access. One scheduler is located in the MN and the other in the SN. The MN and SN are connected via a network interface and at least the MN is connected to the core network.

As described in 3GPP TS 37.340, E-UTRAN supports MR-DC via E-UTRA-NR Dual Connectivity (EN-DC), in which a UE is connected to one LTE eNB that acts as a MN and one NR gNB that acts as a SN as shown in FIG. 1C. The MN i.e. LTE eNB is connected to the EPC and the SN i.e. NR gNB is connected to the MN i.e. LTE eNB via the Xn interface.

NG-RAN supports NG-RAN E-UTRA-NR Dual Connectivity (NGEN-DC), in which a UE is connected to one LTE ng-eNB that acts as a MN and one NR gNB that acts as a SN as shown in FIG. 1D. The LTE ng-eNB is connected to the 5G-Core (5GC) and the NR gNB is connected to the MN i.e. LTE ng-eNB via the Xn interface. The LTE ng-eNB is also referred as eLTE eNB.

NG-RAN supports NR-E-UTRA Dual Connectivity (NE-DC), in which a UE is connected to one NR gNB that acts as a MN and one LTE ng-eNB that acts as a SN as shown in FIG. 1E. The NR gNB is connected to 5GC and the LTE ng-eNB is connected to the MN i.e. NR gNB via the Xn interface.

NG-RAN supports also NR-NR Dual Connectivity (NR-NR DC), in which a UE is connected to one NR gNB that acts as a MN and another NR gNB that acts as a SN as shown in FIG. 1F. The MN i.e. NR gNB is connected to 5GC and the SN i.e. NR gNB is connected to the MN i.e. NR gNB via the Xn interface.

In MR-DC, the UE has a single RRC state, based on the MN RRC and a single C-plane connection towards the Core Network. Each radio node has its own RRC entity (E-UTRA version i.e. LTE RRC if the node is an LTE eNB or LTE ng-eNB or NR version i.e. NR RRC if the node is a NR gNB) which can generate RRC PDUs to be sent to the UE. RRC PDUs generated by the SN can be transported via the MN to the UE. The MN always sends the initial SN RRC configuration via MCG SRB, but subsequent reconfigurations may be transported via MN or SN. When transporting RRC PDU from the SN via SCG SRB, the MN does not modify the UE configuration provided by the SN.

In MR-DC, the radio protocol architecture that a particular radio bearer uses depends on how the radio bearer is setup. Four bearer types exist: MCG bearer, MCG split bearer, SCG bearer and SCG split bearer. These four bearer types are depicted in FIGS. 2A and 2B assuming the NR user plane protocol stack. The MCG bearer is a MN terminated bearer having the associated PDCP entity anchored in the MN. The lower part of Layer 2 configuration associated with RLC entity and MAC entity for the MCG bearer can be configured either in the MN or SN. The SCG bearer is a SN terminated bearer having the associated PDCP entity anchored in the SN. The lower part of Layer 2 configuration associated with RLC entity and MAC entity for the SCG bearer can be configured either in the MN or SN. The MCG Split bearer is a MN terminated bearer having the associated PDCP entity anchored in the MN. The lower part of Layer 2 configuration associated with RLC entity and MAC entity for the MCG Split bearer can be configured in both the MN and SN. The SCG Split bearer is a SN terminated bearer having the associated PDCP entity anchored in the SN. The lower part of Layer 2 configuration associated with RLC entity and MAC entity for the SCG Split bearer can be configured in both the MN and SN. In the FIGS. 2A and 2B when the LTE eNB is MN and connected EPC i.e. EN-DC (as depicted in FIG. 1C), the SDAP layer is not present in the user plane protocol stack. The MCG bearer or MN terminated bearer can be configured with either LTE PDCP or NR PDCP while the MCG Split bearer i.e. MN terminated Split bearer, the SCG Split bearer i.e. SN terminated Split bearer and SCG bearer i.e. SN terminated bearer is configured with NR PDCP. However when the CNB (i.e. LTE ng-eNB) is MN and connected to 5G-CN i.e. NGEN-DC (as depicted in FIG. 1D), then the SDAP layer protocol stack is present FIGS. 2A and 2B. The MCG bearer i.e. MN terminated bearer can be configured with either LTE PDCP or NR PDCP while the MCG Split bearer, SCG Split bearer and SCG bearer is configured with NR PDCP in the EN-DC configuration (as depicted in FIG. 1C). The MCG bearer i.e. MN terminated bearer, the MCG Split bearer, SCG Split bearer and SCG bearer is configured with NR PDCP in NGEN-DC configuration (as depicted in FIG. 1D).

In LTE-DC bearer type change occurs either through HO or SN change as a result L2 entities are re-establish and reset. This is introduced to simplify the bearer type change procedure. This procedure impacts the data on other bearers also. This causes interruption in user services. Therefore, in the MR-DC configurations there is need to realize bearer type change without the handover procedure in addition to realizing the bearer type change with HO procedure or SN change procedure.

The above information is presented as background information only to help the reader to understand the present invention. Applicants have made no determination and make no assertion as to whether any of the above might be applicable as Prior Art with regard to the present application.

Technical Solution

The principal object of the embodiments herein is to provide a method and system for performing a bearer type change of a plurality of bearers configured for a User Equipment (UE) in a wireless communication system.

Another object of the embodiments herein is to decide by a network to change a bearer type of one or more configured radio bearers.

Another object of the embodiments herein is to determine whether a termination point of an entity corresponding to an upper part of the Layer 2 configuration associated with a configured bearer is relocated from a first network node to a second network node.

Another object of the embodiments herein is to determine whether there is modification of the entity corresponding to a lower part of the Layer 2 configuration associated with the configured bearer.

Another object of the embodiments herein is to indicate to a User Equipment (UE) to perform one or more operations for changing the bearer type.

Another object of the embodiments herein is to perform a change in the security key associated with the configured bearer if it is determined that the termination point of the PDCP entity corresponding to the configured bearer has relocated.

Another object of the embodiments herein is not to change associated with the configured bearer upon determining the termination point corresponding to the PDCP entity has not relocated.

Another object of the embodiments herein is to perform the bearer type change through a handover procedure or a Secondary Node (SN) change procedure in response to performing change in the security key associated with the configured bearer.

Another object of the embodiments herein is to perform the bearer type change through a RRC reconfiguration procedure when there is no change in the security key associated with the configured bearer.

Another object of the embodiments herein is to perform a bearer type change from a MN terminated bearer to a MN terminated Split bearer.

Another object of the embodiments herein is to perform a bearer type change from a MN terminated Split bearer to a MN terminated bearer.

Another object of the embodiments herein is to perform a bearer type change from a SN terminated bearer to a SN terminated Split bearer.

Another object of the embodiments herein is to perform a bearer type change from a SN terminated Split bearer to a SN terminated bearer.

Another object of the embodiments herein is to perform a bearer type change from a MN terminated bearer to a SN terminated bearer.

Another object of the embodiments herein is to perform a bearer type change from a SN terminated bearer to a MN terminated bearer.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which:

FIG. 4B is a flow chart illustrating various steps for performing bearer type change through handover procedure, according to an embodiment as disclosed herein;

BEST MODE

Figure 1A:
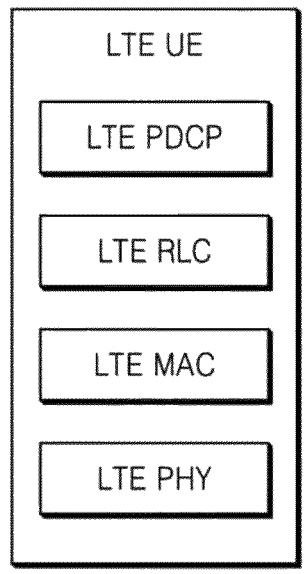
FIG. 1A illustrates Long Term Evolution (LTE) user plane protocol stack, according to a prior art.
Figure 1B:
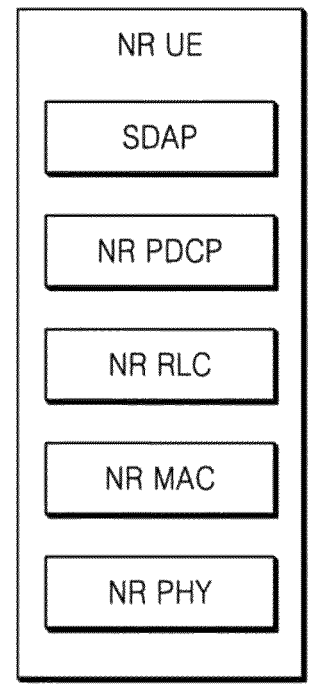
FIG. 1B illustrates New Radio (NR) user plane protocol stack, according to a prior art.

Accordingly embodiments herein provide a method for performing a bearer type change of a plurality of bearers configured for a User Equipment (UE) in a wireless communication system. The method includes deciding, by a Master Node (MN) or a Secondary Node (SN), to change a bearer type of one or more configured radio bearers. The method includes determining whether a termination point of an entity corresponding to an upper part of the Layer 2 configuration associated with a configured bearer is relocated from a first network node to a second network node. The method includes determining whether there is modification of an entity corresponding to a lower part of the Layer 2 configuration associated with the configured bearer. Further, the method includes indicating, by the MN, to a User Equipment (UE) to perform one or more operations for changing the bearer type.

In an embodiment, performing the bearer type change from a MN terminated bearer to a SN terminated bearer includes determining that a change in the security key associated with the configured bearer due to PDCP termination point relocation. The method includes transmitting, by MN, a SN modification request message comprising the bearer type change from the MN terminated bearer to a SN terminated bearer and SCG configuration information to the SN. The method includes receiving, by MN, a SN modification acknowledgement message comprising a new SCG configuration with a PDCP reestablish indication and a security key change indication from the SN. The method includes transmitting a RRC reconfiguration message including new configuration information to the UE for realizing the bearer type change, wherein the new configuration information indicates the UE to perform at least one of the following operations including reestablishing the PDCP entity and applying the security key change, if the MN is LTE CNB, first reestablish the RLC entity associated with the MCG MAC entity and then release the RLC entity and the corresponding logical channel. Else if the MN is NR gNB, release the RLC entity associated with the MCG MAC entity and the corresponding logical channel, and reestablishing a RLC entity associated with the SCG MAC entity and associate the configured logical channel with the SCG MAC entity and do not reset MCG MAC entity if the logical channel identifier (LCID) of the logical channel associating the RLC entity with SCG MAC entity is different than the LCID of the released logical channel.

In an embodiment, performing the bearer type change from a SN terminated bearer to a MN terminated bearer includes determining a change in the security key associated with the configured bearer due to PDCP termination point relocation. The method includes transmitting, by SN, a SN modification required message comprising the bearer type change from SN terminated bearer to a MN terminated bearer and a new SCG configuration to the MN. The method includes receiving, by SN, a SN modification request message comprising the bearer type change from the SN terminated to a MN terminated bearer from the MN. The method includes receiving, by MN, a SN modification acknowledgement message comprising a PDCP reestablish indication and a security key change indication from the SN. The method includes transmitting a RRC reconfiguration message including a new configuration information to the UE for realizing the bearer type change. The new configuration indicates the UE to perform at least one of the following operations including reestablishing the PDCP entity and applying the security key change, if the SN is NR gNb, releasing the RLC entity associated with the SCG MAC entity and the corresponding logical channel. Else, if the SN is LTE eNB, first reestablish the RLC entity associated with the SCG MAC entity and then release the RLC entity and the corresponding logical channel. Reestablish the RLC entity associated with the MCG MAC entity and associate the configured logical channel with the MCG MAC entity and do not reset SCG MAC entity if the logical channel identifier (LCID) of the logical channel associating the RLC entity with MCG MAC entity is different than the LCID of the released logical channel.

Accordingly the embodiments herein provide a network for performing a bearer type change of a plurality of bearers configured for a User Equipment (UE) in a wireless communication system. The network is configured to decide to change a bearer type of one or more configured radio bearers. The network is configured to determine whether the termination point of the entity associated with the upper part of the Layer 2 configuration associated with a configured bearer is relocated from a first network node to a second network node. The network is configured to determine whether there is modification of the entity associated with a lower part of the Layer 2 configuration associated with the configured bearer. Further, the network is configured to indicate, to a User Equipment (UE) to perform one or more operations for changing the bearer type.

In an embodiment, the entity corresponding to the upper part of the Layer 2 configuration associated with the configured radio bearer is a Packet Data Convergence Protocol (PDCP) entity and the entity corresponding to the lower part of the Layer 2 configuration associated with the configured radio bearer comprises a Radio Link Control (RLC) entity, a logical channel configuration and a Medium Access Control (MAC) entity.

In an embodiment, the MN is one of a LTE eNB connected to an Evolved Packet Core (EPC), LTE eNB connected to 5G Core (5GC) and NR gNB connected to 5GC and the SN is one of NR gNB and LTE eNB.

In an embodiment, the bearer type comprises: a MN terminated bearer, if the PDCP entity of the configured radio bearer is terminated in MN and the corresponding lower part of the Layer 2 configuration of the configured radio bearer exists either in MN or SN; a SN terminated bearer, if the PDCP entity of the configured radio bearer is terminated in SN and the corresponding lower part of the Layer 2 configuration of the configured radio bearer exists either in MN or SN; a MN terminated Split bearer, if the PDCP entity of the configured radio bearer is terminated in MN and the corresponding lower part of the Layer 2 configuration of the configured radio bearer exists both in MN and SN; and a SN terminated Split bearer, if the PDCP entity of the configured radio bearer is terminated in SN and the corresponding lower part of the Layer 2 configuration of the configured radio bearer exists both in MN and SN.

In an embodiment, the network decides to change the type of the one or more configured radio bearers comprises one of: if it is determined that the termination point of the PDCP entity corresponding to the configured bearer has relocated, performing a change in the security key associated with the configured bearer; and else do not change the security key associated with the configured bearer upon determining the termination point of the corresponding PDCP entity has not relocated.

In an embodiment, the network is configured to perform the bearer type change through one of a handover procedure and a Secondary Node (SN) change procedure in response to performing change in the security key associated with the configured bearer.

In an embodiment, the network is configured to perform the bearer type change through an RRC reconfiguration procedure in response to determining that there is no change in the security key associated with the configured bearer.

In an embodiment, when the bearer type change is performed through the handover procedure, the network is configured to indicate the UE to perform at least one of the following operations: re-establish the PDCP entity associated with each MN terminated bearer and each MN terminated Split bearer; re-establish the PDCP entity associated with each SN terminated bearer and each SN terminated Split bearer; re-establish the RLC entity associated with each MN terminated bearer and re-establish the RLC entities associated with each MN terminated Split bearer; re-establish the RLC entity associated with each SN terminated bearer and re-establish the RLC entities associated with each SN terminated Split bearer; reset the Master Cell Group (MCG) MAC entity; and reset the Secondary Cell Group (SCG) MAC entity.

In an embodiment, when the bearer type change is performed through SN change procedure, the network is configured to indicate the UE to perform at least one of the following operations: re-establish the PDCP entity associated with each SN terminated bearer and each SN terminated Split bearer; re-establish the RLC entity associated with each SN terminated bearer and re-establish the RLC entities associated with each SN terminated Split bearer; and reset the Secondary Cell Group (SCG) MAC entity.

In an embodiment, the network is configured to perform the RRC reconfiguration procedure to perform at least one of: a bearer type change from a MN terminated bearer to MN terminated Split bearer and from a MN terminated Split bearer to a MN terminated bearer; a bearer type change from SN terminated bearer to SN terminated Split bearer and from a SN terminated Split bearer to a SN terminated bearer; and a bearer type change from MN terminated bearer to SN terminated bearer and from a SN terminated bearer to a MN terminated bearer.

In an embodiment, when the network is configured to perform the bearer type change from a MN terminated bearer to a MN terminated Split bearer by: transmitting, by MN, a SN modification request message comprising the bearer type change from a MN terminated bearer to a MN terminated Split bearer and SCG configuration information to the SN; receiving, by MN, a SN modification acknowledgement message with a new SCG configuration from the SN; transmitting a RRC reconfiguration message including new configuration information to the UE for realizing the bearer type change, wherein the new configuration information indicates the UE to perform at least one of following operations: reconfigure the SCG MAC entity if it exists else establish a SCG MAC entity; establish a RLC entity and associate the configured logical channel with the SCG MAC entity; reconfigure the PDCP entity corresponding to the configured bearer and associate it with both the RLC entities.

In an embodiment, the network is configured to perform the bearer type change from a MN terminated Split bearer to a MN bearer by: transmitting, by MN, a SN modification request message comprising the bearer type change from MN terminated Split bearer to a MN terminated bearer and SCG configuration information to the SN; receiving, by MN, a SN modification acknowledgement message with a new SCG configuration from the SN; and transmitting a RRC reconfiguration message including new configuration information to the UE for realizing the bearer type change, wherein the new configuration information indicates the UE to perform at least one of following operations: reconfige the SCG MAC entity; if the SN is NR gNB, release the RLC entity associated with the SCG MAC entity and the corresponding logical channel; else if the SN is LTE eNB, first re-establish the RLC entity associated with the SCG MAC entity and then release the RLC entity and the corresponding logical channel; and perform PDCP recovery operation.

In an embodiment, the network is configured to perform the bearer type change from a SN terminated bearer to a SN terminated Split bearer by: transmitting, by SN, a SN modification required message comprising the bearer type change from SN terminated bearer to a SN terminated Split bearer and a new SCG configuration to the MN; receiving, by SN, a SN modification request message comprising the bearer type change from SN terminated bearer to a SN terminated Split bearer from the MN; receiving, by MN, a SN modification acknowledgement message from the SN; transmitting a RRC reconfiguration message including new configuration information to the UE for realizing the bearer type change, wherein the new configuration information indicates the UE to perform at least one of following operations: reconfigure the MCG MAC entity; establish a RLC entity and associate the configured logical channel with the MCG MAC entity; and reconfigure the PDCP entity of the configured bearer and associate it with both the RLC entities.

In an embodiment, the network is configured to perform the bearer type change from a SN terminated Split bearer to a SN bearer by: transmitting, by SN, a SN modification required message comprising the bearer type change from SN terminated Split bearer to a SN terminated bearer and a new SCG configuration to the MN; receiving, by SN, a SN modification request message comprising the bearer type change from SN terminated Split bearer to a SN terminated bearer from the MN; receiving, by MN, a SN modification acknowledgement message from the SN; transmitting a RRC reconfiguration message including new configuration information to the UE for realizing the bearer type change, wherein the new configuration information indicates the UE to perform at least one of following operations: reconfigure the MCG MAC entity; if the MN is LTE eNB, first re-establish the RLC entity associated with the MCG MAC entity and then release the RLC entity and the corresponding logical channel; else if the MN is NR gNB, release the RLC entity associated with the MCG MAC entity and the corresponding logical channel; and perform PDCP recovery operation.

In an embodiment, the network is configured to perform the bearer type change from a MN terminated bearer to a SN terminated bearer by: determining that a change in the security key associated with the configured radio bearer due to PDCP termination point relocation; transmitting, by MN, a SN modification request message comprising the bearer type change from the MN terminated bearer to a SN terminated bearer and SCG configuration information to the SN; receiving, by MN, a SN modification acknowledgement message comprising a new SCG configuration with a PDCP reestablish indication and a security key change indication from the SN; transmitting a RRC reconfiguration message including new configuration information to the UE for realizing the bearer type change, wherein the new configuration information indicates the UE to perform at least one of the following operations: reestablish the PDCP entity and apply the security key change; if the MN is LTE eNB, first reestablish the RLC entity associated with the MCG MAC entity based on the received RLC reestablishment indication and then release the RLC entity and the corresponding logical channel; else if the MN is NR gNB, release the RLC entity associated with the MCG MAC entity and the corresponding logical channel; reestablish a RLC entity associated with the SCG MAC entity and associate the configured logical channel with the SCG MAC entity; and do not reset MCG MAC entity if the logical channel identifier (LCID) of the logical channel associating the RLC entity with SCG MAC entity is different than the LCID of the released logical channel.

In an embodiment, the network is configured to perform the bearer type change from a SN terminated bearer to a MN terminated bearer by: determining a change in the security key associated with the configured radio bearer due to PDCP termination point relocation; transmitting, by SN, a SN modification required message comprising the bearer type change from SN terminated bearer to a MN terminated bearer and a new SCG configuration to the MN; receiving, by SN, a SN modification request message comprising the bearer type change from the SN terminated to a MN terminated bearer from the MN; receiving, by MN, a SN modification acknowledgement message comprising a PDCP reestablish indication and a security key change indication from the SN; transmitting a RRC reconfiguration message including a new configuration information to the UE for realizing the bearer type change, wherein the new configuration indicates the UE to perform at least one of the following operations: reestablish the PDCP entity and apply the security key change; if the SN is NR gNB, release the RLC entity associated with the SCG MAC entity and the corresponding logical channel; else if the SN is LTE eNB, first reestablish the RLC entity associated with the SCG MAC entity and then release the RLC entity and the corresponding logical channel; reestablish the RLC entity associated with the MCG MAC entity and associate the configured logical channel with the MCG MAC entity; and do not reset SCG MAC entity if the logical channel identifier (LCID) of the logical channel associating the RLC entity with MCG MAC entity is different than the LCID of the released logical channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

MODE FOR INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Prior to describing the various embodiments of the present disclosure, the following information is presented herein for better understanding of the various embodiments.

Figure 1C:
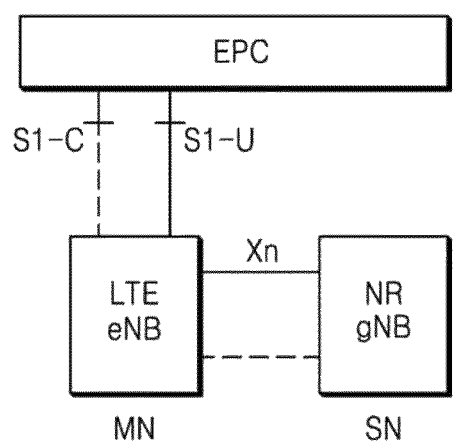
FIG. 1C illustrates an EN-DC architecture, according to a prior art.
Figure 1C:
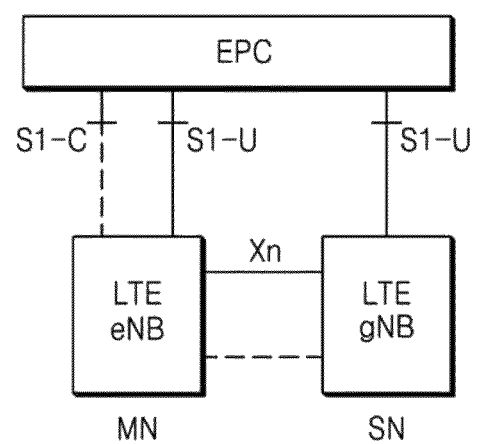
Figure 1D:
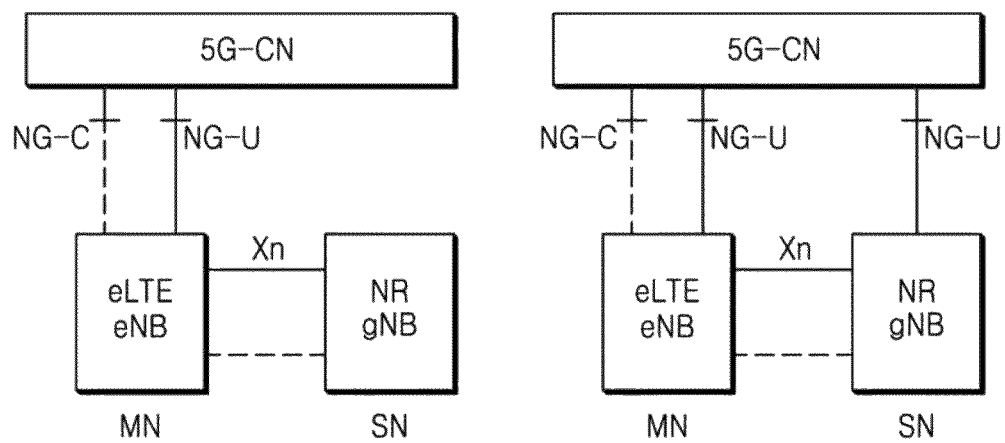
FIG. 1D illustrates a NGEN-DC architecture, according to a prior art.
Figure 1E:
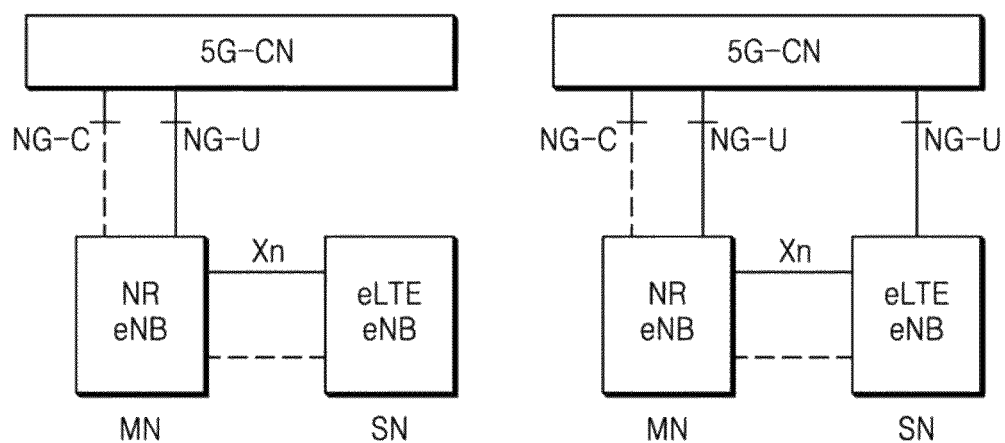
FIG. 1E illustrates a NE-DC architecture, according to a prior art.
Figure 1F:
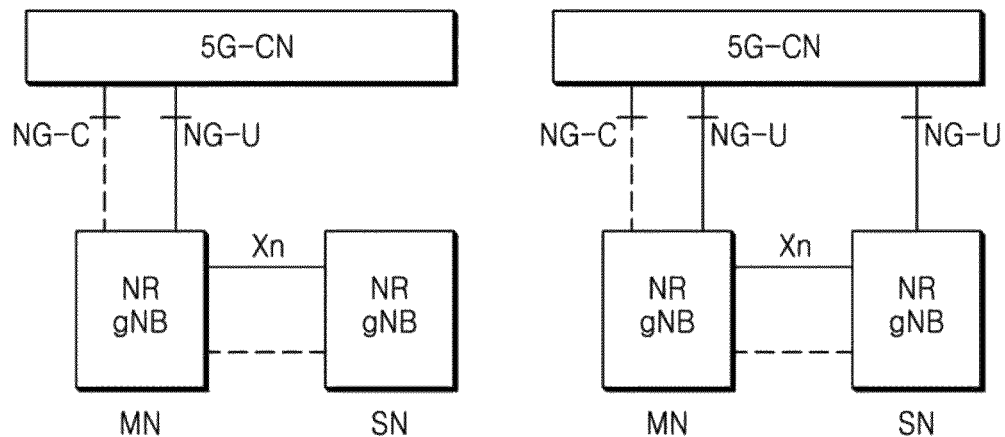
FIG. 1F illustrates a NR-NR DC architecture, according to a prior art.

The UE can be configured to operate in dual connectivity (DC) mode of operation wherein the UE maintains RRC connection with a serving cell from the master node (MN) and the UE can be configured with one or more serving cells from the secondary node (SN) for addition data throughput. The data radio bearer (DRB) established on the serving cell of MN has the PDCP anchor point terminated at the MN and such DRB is referred as MCG DRB i.e. MN terminated bearer. The data radio bearer (DRB) established on the serving cell of SN has the PDCP anchor point terminated at the SN and such DRB is referred as SCG DRB i.e. SN terminated bearer. The UE can be configured with a split DRB wherein the PDCP PDUs can be transmitted through the two RLC entities established in the MN and SN for that DRB. The PDCP anchor point of such split DRB can be configured to be terminated either at the MN or SN and it is decided by the MN. If the PDCP termination point of the split DRB is MN then the DRB is referred as MCG Split DRB i.e. MN terminated Split bearer. If the PDCP termination point of the split DRB is SN then the DRB is referred as SCG Split DRB i.e. SN terminated Split bearer. For the LTE and NR interworking based on DC i.e. EN-DC mode of operation (i.e. configuration in FIG. 1C) where the MN is LTE eNB and SN is NR gNB, the MCG DRB can be configured with either LTE PDCP or NR PDCP whereas the split DRB (regardless of the PDCP termination point) and SCG DRB is configured with NR PDCP.

From UE perspective there are only three bearer types i.e. MCG DRB, SCG DRB and Split DRB. The split DRB can either terminate at MN or terminate at SN based on MN decision. In EN-DC and NGEN-DC, network can configure the split bearer with the following configuration:

Split bearer: The LTE RRC signaling includes NR PDCP container+LTE configurations on RLC, MAC and physical layers+NR configuration container on NR RLC, MAC and physical layers, etc. Split bearer whose PDCP termination point is at MN can be termed as split bearer terminated at MN or MCG split bearer or MN terminated Split bearer. Split bearer whose PDCP termination point is at SN can be termed as the split bearer terminated at SN or SCG split bearer or SN terminated Split bearer. These split bearer can be either transparent to the UE or UE is aware of the termination point of split bearer. This is based on number of configured security keys.

In NE-DC, network can configure the split bearer with the following configuration: Split bearer: The NR RRC signaling includes LTE Layer 2 container for RLC, MAC+NR configurations on RLC, MAC and physical layers+NR configuration for PDCP etc.

There are three options for security keys which are considered for EN-DC (also applicable for NGEN-DC, NE-DC and NR-NR DC) or MR-DC: a. Security key per PDCP termination point i.e. 2 security keys: UE uses two set of keys i.e. one for all MCG bearers and MCG-anchored split bearers and another one for all SCG bearers and SCG-anchored split bearers. This is similar to LTE Rel-12 DC. In case of separate security key per network termination point, UE based on security keys can make it out whether the split bearer terminates at MN or terminates at SN. In this case UE will be aware of location of PDCP anchor point i.e. whether split bearer is terminated at MN or SN.

b. Security key per bearer type i.e. 3 security keys. The UE uses different key per bearer type i.e. three separate keys for MCG, SCG and Split bearers. As in this case split bearer terminates at MN or SN can use separate keys from MCG and SCG bearers, so in this option split bearer termination point is transparent to UE.

c. Security key per DRB: In this there will be separate key for each DRB. UE will use separate keys for each bearer which is configured and it is not based on termination point. so the bearers like MCG bearer, MCG split bearer, SCG bearer and SCG split bearer will use separate set of keys. The split bearer termination point is transparent to UE when security key is per DRB configured.

In case of Security key per PDCP termination point (option a), UE based on the indicated security key for the split bearer can make out termination point of split bearer. With security key per bearer type (option b) or Security key per DRB (option c) for the configured split bearer the UE cannot make out termination point of split bearer.

The option b and option c brings additional complexity to handle these bearer type changes as follows:
 i. during these bearer type changes keys will always have to be changed;
 ii. the key change for these bearer type changes occurs even when the PDCP termination point has not changed (according to security principle key should be changed when PDCP termination point changes);
 iii. if keys are changed then MAC reset is needed which can cause the impact on the other bearers also.

When option b and option c is applied then to avoid MAC reset special handling is needed to ensure that the data on other bearer is not impacted. Such special handling bring additional complexity which can be completely avoided if (option a) is applied. Option b and Option c requires MAC reset during MCG to/from MCG split and SCG to/from SCG Split bearer type change even when PDCP termination point is not changed. To avoid MAC reset special handling is required which brings additional complexity. Making the PDCP termination point for split bearer transparent to the UE when the option b and option c is applied does not really bring benefits for the UE in terms of bearer type change handling or reducing complexity. Option a offers the same level of security protection as the option b and c. In EN-DC, NGEN-DC, NE-DC and NR-NR DC Security key per PDCP termination point i.e. 2 security keys can be supported. In LTE DC, during handover procedure keys refresh will also occur which will impact keys for configured bearers i.e., K-eNB (security key associated to MN terminated bearer and MN terminated Split bearer) and S-KeNB (security key associated with SN terminated bearer) as a result UE need to reset and re-establish the L2 entities for all the configured bearers to take care of data with old keys and support lossless transition. In EN-DC similar concept is applicable, during handover procedure for the UE configured with MCG bearer, split bearer and SCG bearer, the MCG/SCG PDCP/RLC entities should be re-established and MCG/SCG MAC entities should be reset. SCG change is a synchronous SCG reconfiguration procedure (i.e. involving RA to the PSCell) i.e. SN change procedure including reset/re-establishment of layer 2 entities of SCG, if SCG DRBs are configured, refresh of security (S-KgNB). The SN change procedure is used in a number of different scenarios e.g. SCG establishment, PSCell change, Key refresh, change of DRB type in Rel-12

LTE DC. In this case all DRB associated with L2 entities need to be re-established and reset.

In EN-DC, if bearer type change occurs through handover or SN change, then UE needs to follow the same rule as applicable during handover or SN change for the concerned bearer type change. SN change is a synchronous SCG reconfiguration procedure including reset/re-establishment of layer 2 entities of SCG, if SCG DRBs are configured, refresh of security. If Bearer type change happens through handover procedure in EN-DC then MCG bearer, split bearer and SCG bearer, the MCG/SCG PDCP/RLC entities should be re-established and MCG/SCG MAC entities should be reset. If Bearer type change happens through SN change procedure then for the concerned radio bearer the SCG PDCP entity is re-established, SCG RLC entity is re-established, and SCG MAC is reset.

Figure 2A:
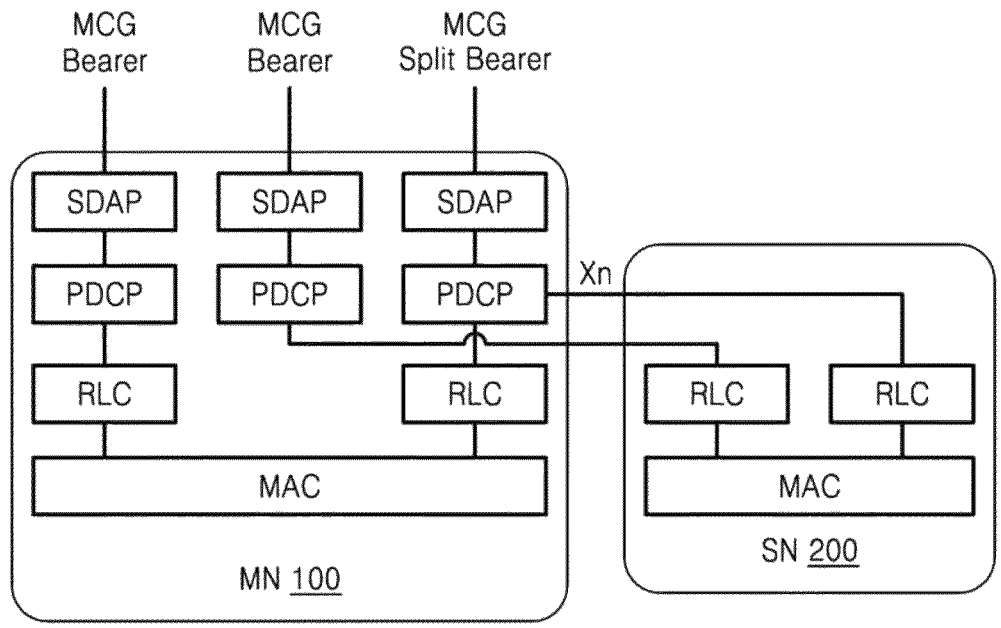
FIG. 2A illustrates a MCG and MCG split bearer architecture, according to a prior art.
Figure 2B:
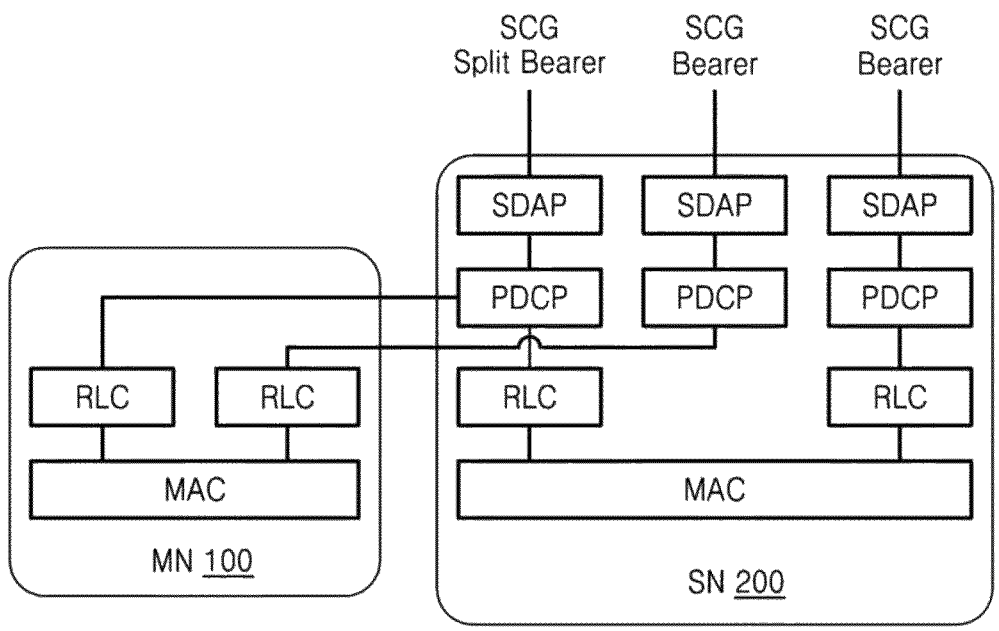
FIG. 2B illustrates SCG and SCG split bearer architecture, according to a prior art.

Bearer Type Change without Mobility Procedure:

Bearer type change through HO or SN change may cause data loss or interruption in services. There are few bearer type changes which do not involve change in PDCP termination point or change in security keys or change in the PDCP version. Those bearer type changes can be supported without mobility procedure i.e. not using HO procedure or SN change procedure for bearer type change. This invention elaborates about bearer type change that can occur without mobility (i.e. realizing bearer type without HO procedure or SN change procedure) and corresponding L2 handling Consider the case if UE is supporting Security key per PDCP termination point i.e. 2 security key then bearer type change between MCG bearer (i.e. MN terminated bearer) and MCG split bearer (i.e. MN terminated Split bearer) does not involve change in security key or termination point of the PDCP entity as shown in FIG. 2A. In this case there is no need of any synchronous reconfiguration procedure as PDCP termination point does not change. This type of bearer change can be supported without mobility (i.e. realizing bearer type without HO procedure) as a result there will be no impact on data of other bearers. So no interruption in user plane and latency can be reduced.

NW may decide to change the bearer type which can happen due to load condition or signal condition. As an example for bearer type change between MCG to/from MCG split or SCG to/from SCG split can be done in scenario if NW wants to improve performance through both links or improve reliability by duplication on both links. In this case there is no change for the PDCP entity in MN or SN node i.e. there is no relocation of PDCP entity from MN to/from SN then bearer type change should be possible without mobility (i.e. realizing bearer type without HO procedure or SN change procedure). Bearer type change without mobility should only be possible when security keys, PDCP version and/or PDCP termination point does not change. This will help to avoid interruption in user plane services and also there will be no impact on other bearers.

Accordingly the embodiments herein provide a method for performing a bearer type change of plurality of radio bearers configured to a User Equipment (UE) in a wireless communication system. The method includes deciding, by a first network node (i.e., a Master Node (MN)) or a second network node (i.e., a Secondary Node (SN)), to change a bearer type of one or more configured radio bearers. The method includes determining whether a termination point of an entity associated with the upper part of the Layer 2 configuration associated with a configured bearer is relocated from the first network node to the second network node. The method includes determining whether there is modification of an entity associated with a lower part of the Layer 2 configuration associated with the configured bearer. Further, the method includes indicating, by the MN, to a User Equipment (UE) to perform one or more operations for changing the bearer type.

Unlike to the conventional methods and systems, the proposed method includes changing the bearer type of specific bearer configured by the network. Further, the proposed method includes determining or checking any changes in security keys or PDCP termination point and/or PDCP version change. Furthermore, the proposed method includes notifying or indicating the UE to change the bearer type through reconfiguration procedure or a handover procedure or SN change procedure. The network indicates one or more operations to the UE for performing the bearer type change.

Referring now to the drawings, and more particularly to FIGS. 3 through 10, there are shown preferred embodiments.

Figure 3:
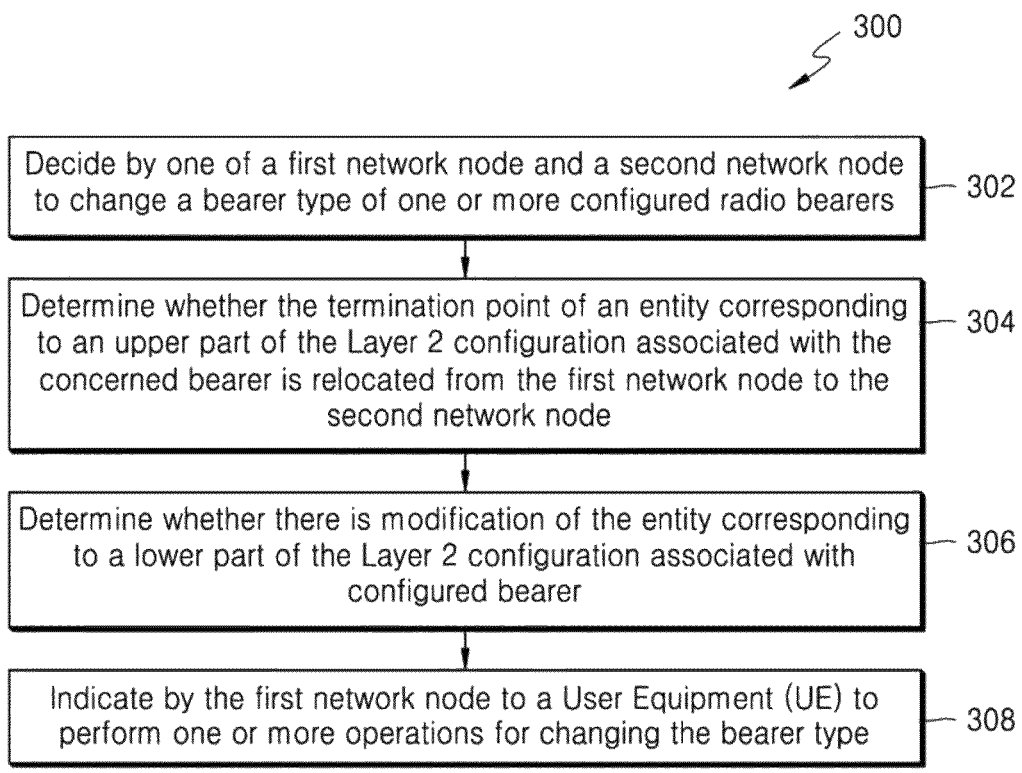
FIG. 3 is a flow chart illustrating a method for performing a bearer type change of a plurality of bearers configured to a User Equipment (UE) in a wireless communication system, according to an embodiment as disclosed herein.

FIG. 3 is a flow chart 300 illustrating a method for performing a bearer type change of a plurality of bearers configured to a User Equipment (UE) in a wireless communication system, according to an embodiment as disclosed herein.

At step 302, the method includes deciding by one of a first network node and a second network node to change a bearer type of one or more configured radio bearers. The first network node and the second network node can be a MN 100 and a SN 200 respectively. The MN can be LTE eNB connected to Evolved Packet Core (EPC), a LTE eNB connected to 5G Core (5GC) and a NR gNB connected to 5GC and the SN can be a NR gNB and a LTE eNB.

In an embodiment, the MN 100 or the SN 200 decides to change the type of the one or more configured radio bearers by determining that that the termination point of the PDCP entity corresponding to the configured bearer has relocated from the MN 100 to SN 200 or from the SN 200 to the MN 100. If the MN 100 to SN 200 determines that the that the termination point of the PDCP corresponding to the configured bearer has relocated, then the MN 100 or SN 200 performs a change in the security key associated with the configured bearer.

In case, it is determined that the termination point corresponding to the PDCP entity has not relocated, then the security key associated with the configured bearer is not changed.

In some embodiments, the MN 100 performs the bearer type change through one a handover procedure or a Secondary Node (SN) change procedure when there is change in the security key associated with the configured bearer.

In various embodiments, the MN 100 performs the bearer type change through a RRC reconfiguration procedure when there is no change in the security key associated with the configured bearer.

In an embodiment, when the bearer type change is performed through the handover procedure, the MN 100 indicates the UE to perform one or more operations, which are described in the later parts of the description.

In another embodiment, when the bearer type change is performed through the SN change procedure, the MN 100 indicates the UE to perform one or more actions.

In yet another embodiment, if it is determined that there is no change in the security key associated with the PDCP entity of the configured bearer, the MN performs the RRC reconfiguration procedure for changing the bearer type from:

1. a MN terminated bearer to MN terminated Split bearer
2. a MN terminated Split bearer to a MN terminated bearer 3. a SN terminated bearer to a SN terminated Split bearer
4. a SN terminated Split bearer to a SN terminated bearer
5. a MN terminated bearer to SN terminated bearer
6. a SN terminated bearer to a MN terminated bearer At step 304, the method includes determining whether the termination point of the entity corresponding to an upper part of the Layer 2 configuration associated with the configured bearer is relocated from the first network node to the second network node. The entity corresponding to the upper part of the Layer 2 configuration associated with the configured bearer is a PDCP entity and the entity corresponding to the lower part of the Layer 2 configuration associated with the configured bearer comprises the Radio Link Control (RLC) entity, logical channel configuration and Medium Access Control (MAC) entity.

At step 306, the method includes determining that there is modification of the entity corresponding to a lower part of the Layer 2 configuration associated with configured bearer.

At step 308, the method includes indicating to a UE to perform one or more operations for changing the bearer type. The MN 100 indicates the UE to perform one or more operations for changing the bearer type. In an embodiment, the MN 100 transmits a RRC reconfiguration message including new configuration information to the UE for realizing the bearer type change. The UE performs one or more actions as indicated to it.

The various actions, acts, blocks, steps, or the like in the flow chart 300 may be performed in the order presented, in a different order or simultaneously. Further, in some embodiments, some of the actions, acts, blocks, steps, or the like may be omitted, added, modified, skipped, or the like without departing from the scope of the invention.

Figure 4A:
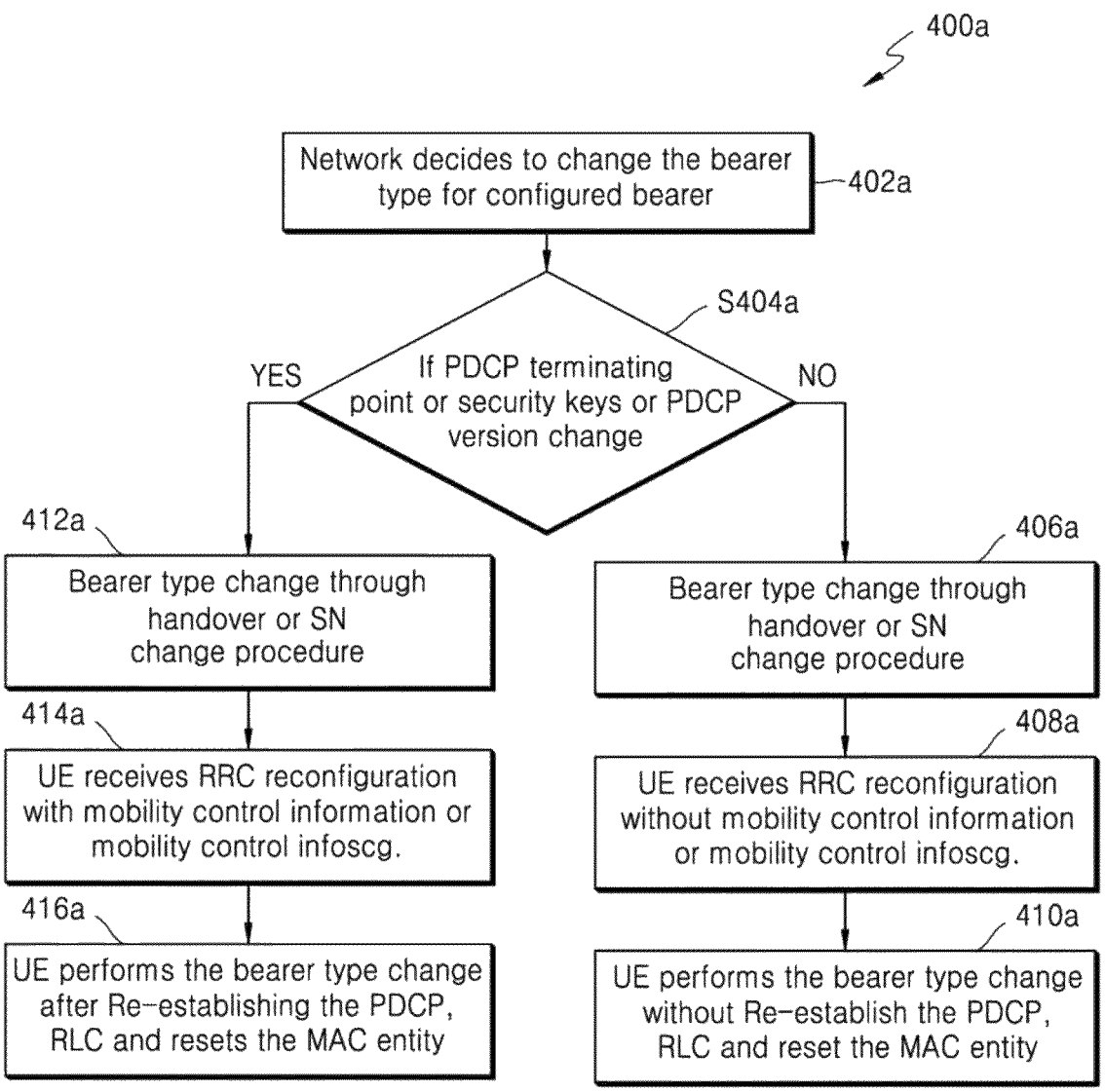
FIG. 4A is a flow chart illustrating various steps for changing the plurality of bearer types, according to an embodiment as disclosed herein.

FIG. 4A is a flow chart 400a illustrating various steps performed by network for changing the plurality of bearer types, according to an embodiment as disclosed herein.

At step 402a, the NW (i.e., MN 100 or SN 200) decides to change the bearer type for specific bearer. At step 404a, the NW determines if there is no change in keys or PDCP termination point or PDCP version change. At step 406a, the NW notifies the UE to change the bearer type through reconfiguration procedure without triggering handover procedure i.e., RRC reconfiguration without mobilitycontrolinformation or RRC reconfiguration without reconfiguration WithSync or without triggering SCG change procedure i.e. RRC reconfiguration without mobilitycontrolinfoscg, at step 408a. At step 410a, the UE may performs bearer type change without impacting the L2 entities i.e., the UE performs bearer type change without PDCP/RLC re-establishment and MAC reset so that data will not be impacted for configured bearer. Alternatively at step 410a, the UE performs the bearer type change without Re-establishing the PDCP entity. PDCP, RLC and MAC entity action will depend on indication received in RRC reconfiguration message. If MN 100 or SN 200 sets the re-establish of MN or SN RLC entity or PDCP data recovery indication for MN or SN PDCP entity, then UE will take action on RLC and PDCP accordingly. In case, at step 404a, If there is change in change in keys or PDCP termination point or PDCP version change, at step 412a, the NW notifies the UE to change the bearer type through reconfiguration procedure through handover or SN change procedure i.e., RRC reconfiguration with mobilitycontrolinformation or mobilitycontrolinfoscg reconfigurationWithSync, at step 414a. At step 416a, the UE performs bearer type change with PDCP/RLC re-establishment and resets MAC entity.

The various actions, acts, blocks, steps, or the like in the flow chart 400a may be performed in the order presented, in a different order or simultaneously. Further, in some embodiments, some of the actions, acts, blocks, steps, or the like may be omitted, added, modified, skipped, or the like without departing from the scope of the invention.

FIG. 4B is a flow chart 400b illustrating various steps indicated to the UE for performing bearer type change through handover procedure, according to an embodiment as disclosed herein. During the handover procedure, the network i.e., MN 100 indicates the UE to perform various operations. The various operations indicated to the UE are shown in the flow chart 400b. The MN 100 indicates the UE in a RRC reconfiguration message to perform one or more operations for performing the bearer type change. At step 402b, the network (i.e., MN 100) indicates the UE to re-establish the PDCP entity associated with each MN terminated bearer and each MN terminated Split bearer. At step 404b, the network (i.e., MN 100) indicates the UE to re-establish the PDCP entity associated with each SN terminated bearer and each SN terminated Split bearer. At step 406b, the network (i.e., MN 100) indicates the UE to re-establish the RLC entity associated with each MN terminated bearer and to re-establish the RLC entities associated with each MN terminated Split bearer. At step 408b, the network indicates the UE to re-establish the RLC entity associated with each SN terminated bearer and to re-establish the RLC entities associated with each SN terminated Split bearer. At step 410b, the network indicates the UE to reset the Master Cell Group (MCG) MAC entity and reset the Secondary Cell Group (SCG) MAC entity.

The various actions, acts, blocks, steps, or the like in the flow chart 400b may be performed in the order presented, in a different order or simultaneously. Further, in some embodiments, some of the actions, acts, blocks, steps, or the like may be omitted, added, modified, skipped, or the like without departing from the scope of the invention.

Figure 4C:
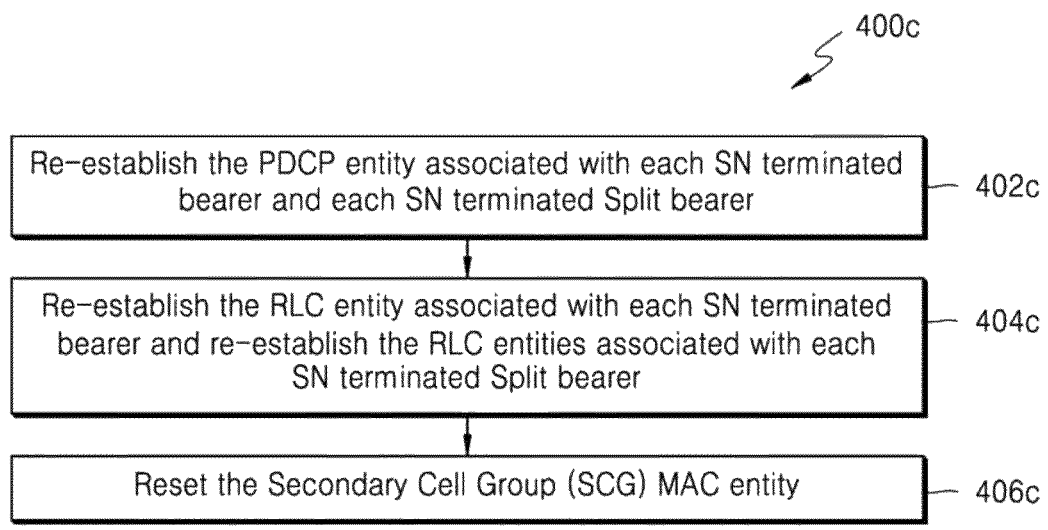
FIG. 4C is a flow chart illustrating various steps for performing bearer type change through SN change procedure, according to an embodiment as disclosed herein.

FIG. 4C is a flow chart 400c illustrating various steps for performing bearer type change through SN change procedure, according to an embodiment as disclosed herein. During the SN change procedure, the network i.e., MN 100 indicates the UE to perform various operations. The various operations indicated to the UE by the MN 100 are shown in the flow chart 400c. The MN 100 indicates the various operations to UE for performing the bearer type change.

At step 402c, the MN 100 indicates the UE to re-establish the PDCP entity associated with each SN terminated bearer and each SN terminated Split bearer. At step 404c, the MN 100 indicates the UE to re-establish the RLC entity associated with each SN terminated bearer and to re-establish the RLC entities associated with each SN terminated Split bearer. At step 406c, the MN 100 indicates the UE to reset the Secondary Cell Group (SCG) MAC entity.

Figure 4D:
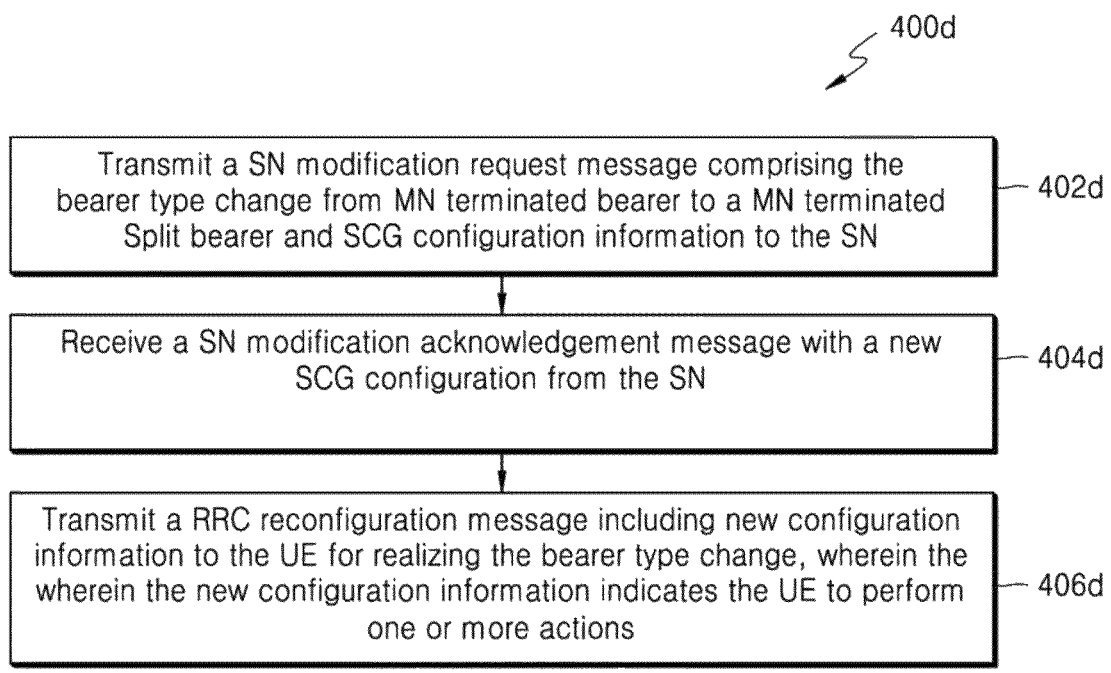
FIG. 4D is a flow chart illustrating various steps for performing bearer type change from a MN terminated bearer to a MN terminated Split bearer, according to an embodiment as disclosed herein.

FIG. 4D is a flow chart 400d illustrating various steps for performing bearer type change from a MN terminated bearer to a MN terminated Split bearer, according to an embodiment as disclosed herein. The MN 100 or SN 200 decides to change a bearer type from the MN terminated bearer to a MN terminated Split bearer. For changing the bearer type from the MN terminated bearer to a MN terminated Split bearer, the various steps performed by the MN are shown in the flow chart 400d.

At step 402d, the method includes transmitting a SN modification request message including the bearer type change from the MN terminated bearer to a MN terminated Split bearer and SCG configuration information to the SN 200. The method allows the MN 100 to transmit the SN modification request message including the bearer type change from the MN terminated bearer to a MN terminated Split bearer and SCG configuration information to the SN 200.

At step 404*d*, the method includes receiving a SN modification acknowledgement message with a new SCG configuration from the SN 200. The method allows the MN 100 to receive the SN modification acknowledgement message with SCG configuration from the SN 200.

At step 406*d*, the method includes transmitting a RRC reconfiguration message including new configuration information to the UE for realizing the bearer type change. The method allows the MN 100 to transmit the RRC reconfiguration message including new configuration information to the UE for realizing the bearer type change. The new configuration information indicates the UE to perform one or more operations.

In an embodiment, the new configuration information indicates the UE to reconfigure the SCG MAC entity if it exists, else to establish a SCG MAC entity.

In an embodiment, the new configuration information indicates the UE to establish a RLC entity and to associate the configured logical channel with the SCG MAC entity. The new configuration information indicates the UE to reconfigure the PDCP entity corresponding to the configured bearer and to associate it with both the RLC entities.

The various actions, acts, blocks, steps, or the like in the flow chart 400*d* may be performed in the order presented, in a different order or simultaneously. Further, in some embodiments, some of the actions, acts, blocks, steps, or the like may be omitted, added, modified, skipped, or the like without departing from the scope of the invention.

Figure 4E:
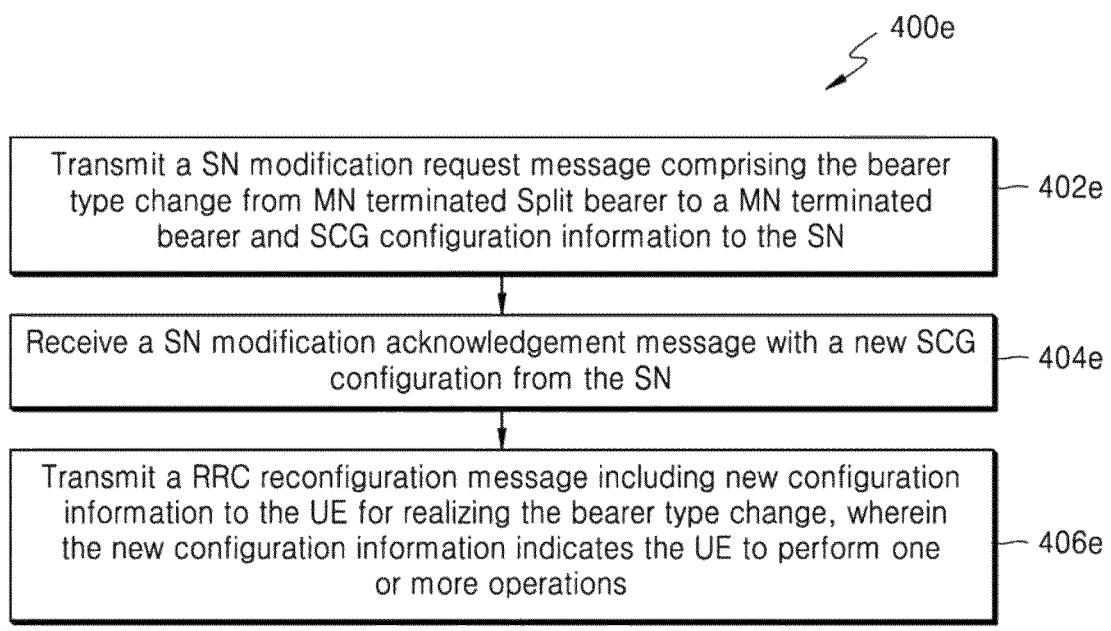
FIG. 4E is a flow chart illustrating various steps for performing bearer type change from a MN terminated Split bearer to a MN terminated bearer, according to an embodiment as disclosed herein.

FIG. 4E is a flow chart 400*e* illustrating various steps for performing bearer type change from a MN terminated Split bearer to a MN terminated bearer, according to an embodiment as disclosed herein. For changing the bearer type from the MN terminated Split bearer to a MN terminated bearer, the various steps performed by the MN 100 are shown in the flow chart 400*c*.

At step 402*e*, the method includes transmitting a SN modification request message comprising the bearer type change from MN terminated Split bearer to a MN terminated bearer and SCG configuration information to the SN 200. The method allows the MN 100 to transmit the SN modification request message including the bearer type change from MN terminated Split bearer to a MN terminated bearer and the SCG configuration information to the SN 200.

At step 404*e*, the method includes receiving a SN modification acknowledgement message with a SCG configuration from the SN 200. The method allows the MN 100 to receive the SN modification acknowledgement message with a SCG configuration from the SN 200.

At step 406*e*, the method includes transmitting a RRC reconfiguration message including new configuration information to the UE for realizing the bearer type change. The new configuration information indicates the UE to perform one or more operations.

In an embodiment, the new configuration information indicates the UE to reconfigure the SCG MAC entity and if the SN is NR gNB, release the RLC entity associated with the SCG MAC entity and the corresponding logical channel. Else, if the SN is LTE eNB, first re-establish the RLC entity associated with the SCG MAC entity and then release the RLC entity and the corresponding logical channel. Further, the new configuration information indicates the UE to perform PDCP recovery operation.

The various actions, acts, blocks, steps, or the like in the flow chart 400*e* may be performed in the order presented, in a different order or simultaneously. Further, in some embodiments, some of the actions, acts, blocks, steps, or the like may be omitted, added, modified, skipped, or the like without departing from the scope of the invention.

Figure 4F:
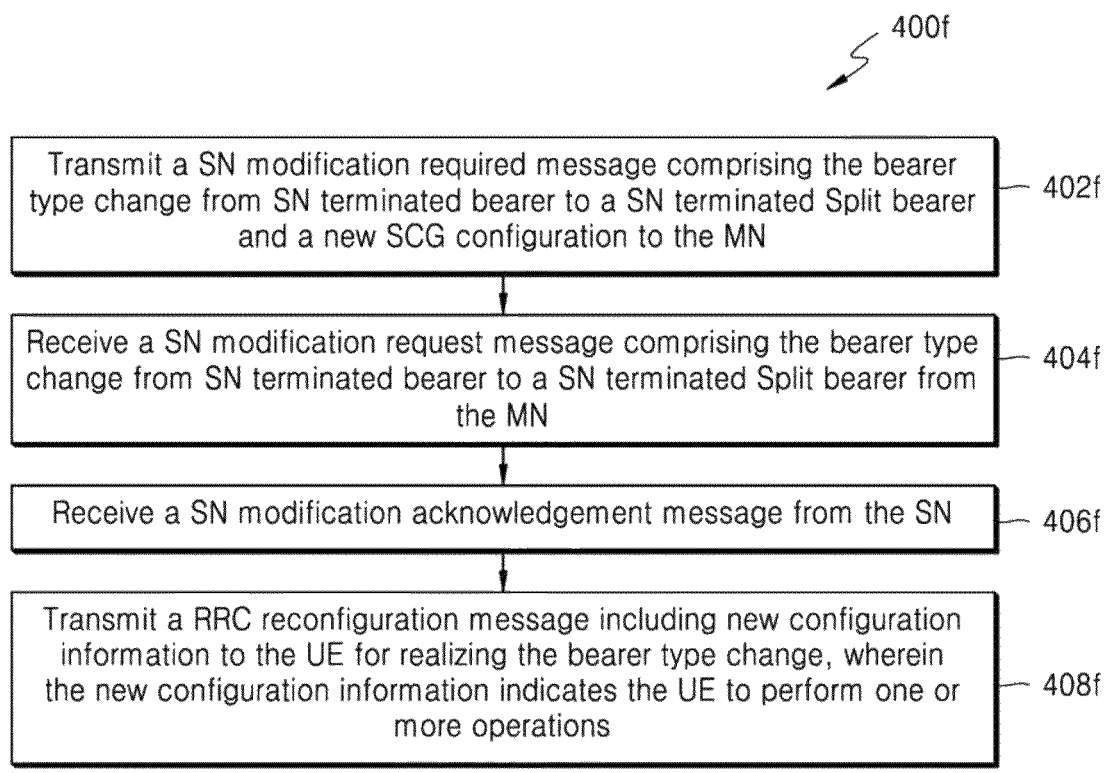
FIG. 4F is a flow chart illustrating various steps for performing bearer type change from a SN terminated bearer to a SN terminated Split bearer, according to an embodiment as disclosed herein.

FIG. 4F is a flow chart illustrating various steps for performing bearer type change from SN terminated bearer to a SN terminated Split bearer, according to an embodiment as disclosed herein. For changing the bearer type from SN terminated bearer to a SN terminated Split bearer, the various steps performed by the MN 100 are shown in the flow chart 400*f*.

At step 402*f*, the method includes transmitting a SN modification required message including the bearer type change from SN terminated bearer to a SN terminated Split bearer to the MN 100. The method allows the SN to transmit the SN modification required message including the bearer type change from SN terminated bearer to a SN terminated Split bearer to the MN 100.

At step 404*f*, the method includes receive a SN modification request message comprising the bearer type change from SN terminated bearer to a SN terminated Split bearer and a new SCG configuration from the MN 100. The method allows the SN 200 to receive a SN modification request message comprising the bearer type change from the SN terminated bearer to the SN terminated Split bearer and SCG configuration from the MN 100.

At step 406*f*, the method includes receiving a SN modification acknowledgement message with from the SN 200. The method allows the MN 100 to receive the SN modification acknowledgement message with SCG configuration from the SN 200.

At step 408*f*, the method includes transmitting a RRC reconfiguration message including new configuration information to the UE for realizing the bearer type change. The method allows the MN 100 to transmit a RRC reconfiguration message including new configuration information to the UE for realizing the bearer type change. The new configuration information indicates the UE to perform one or more operations.

In an embodiment, the new configuration information indicates the UE to reconfigured the MCG MAC entity, establish a RLC entity and associate the configured logical channel with the MCG MAC entity. The new configuration information indicates the UE to reconfigure the PDCP entity corresponding to the configured bearer associate it with both the RLC entities.

The various actions, acts, blocks, steps, or the like in the flow chart 400*f* may be performed in the order presented, in a different order or simultaneously. Further, in some embodiments, some of the actions, acts, blocks, steps, or the like may be omitted, added, modified, skipped, or the like without departing from the scope of the invention.

Figure 4G:
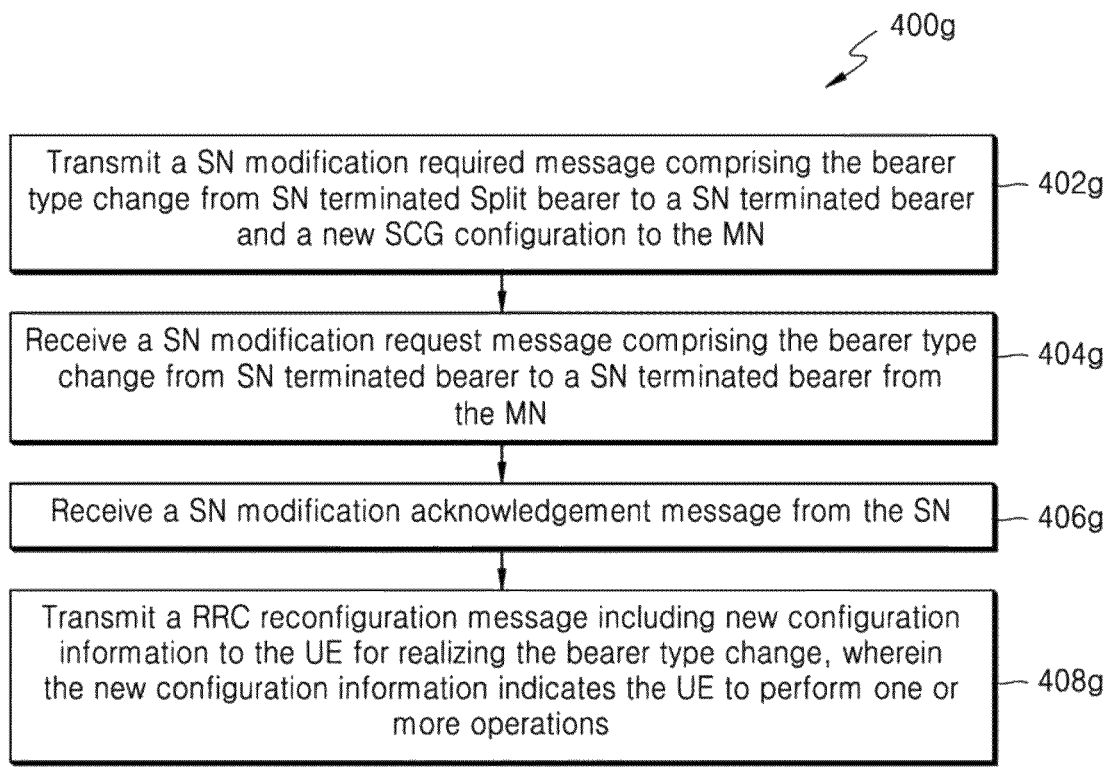
FIG. 4G is a flow chart illustrating various steps for performing bearer type change from a SN terminated Split bearer to a SN terminated bearer, according to an embodiment as disclosed herein.

FIG. 4G is a flow chart illustrating various steps for performing bearer type change from a SN terminated Split bearer to a SN terminated bearer, according to an embodiment as disclosed herein. For changing the bearer type from SN terminated Split bearer to a SN terminated Split bearer, the various steps performed by the MN 100 are shown in the flow chart 400*g*.

At step 402*g*, the method includes transmitting a SN modification required message comprising the bearer type change from SN terminated Split bearer to a SN terminated bearer and a new SCG configuration to the MN 100. The method allows the SN 200 to transmit the SN modification required message comprising the bearer type change from SN terminated Split bearer to a SN terminated bearer to the MN 100.

At step 404g, the method includes receiving a SN modification request message including the bearer type change from SN terminated Split bearer to a SN terminated bearer from the MN 100. The method allows the SN 200 to receive the SN modification request message including the bearer type change from SN terminated Split bearer to a SN terminated bearer and SCG configuration information from the MN 100.

At step 406g, the method includes receiving a SN modification acknowledgement message from the SN. The method allows the MN 100 to receive the SN modification acknowledgement message with a SCG configuration from the SN 200.

At step 408g, the method includes transmitting a RRC reconfiguration message including new configuration information to the UE for realizing the bearer type change. The method allows the MN 100 to transmit the RRC reconfiguration message including new configuration information to the UE for realizing the bearer type change. The new configuration information indicates the UE perform one or more operations which include reconfiguring the MCG MAC entity, if the MN is LTE eNB, first re-establishing the RLC entity associated with the MCG MAC entity and then release the RLC entity and the corresponding logical channel. Else, if the MN is NR gNB, release the RLC entity associated with the MCG MAC entity and the corresponding logical channel. The new configuration information indicates the UE to perform PDCP recovery operation.

The various actions, acts, blocks, steps, or the like in the flow chart 400g may be performed in the order presented, in a different order or simultaneously. Further, in some embodiments, some of the actions, acts, blocks, steps, or the like may be omitted, added, modified, skipped, or the like without departing from the scope of the invention.

Figure 4H:
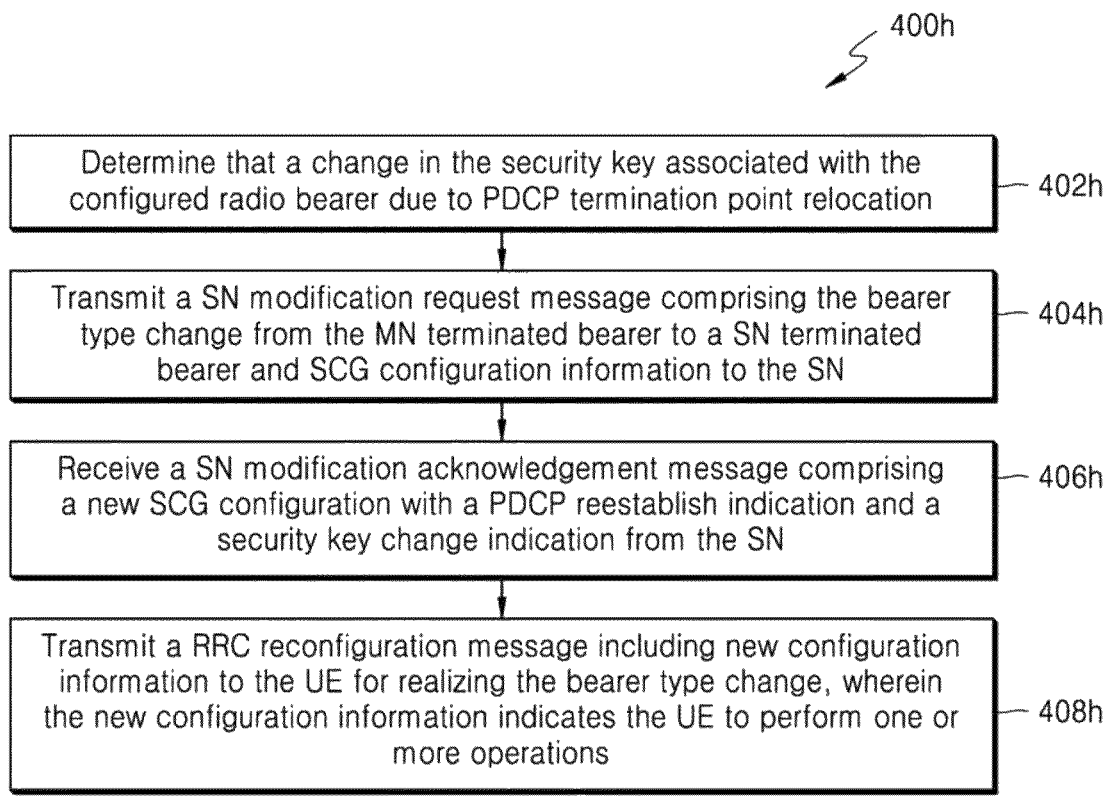
FIG. 4H is a flow chart illustrating various steps for performing bearer type change from a MN terminated bearer to a SN terminated bearer, according to an embodiment as disclosed herein.

FIG. 4H is a flow chart illustrating various steps for performing bearer type change from a MN terminated bearer to a SN terminated bearer, according to an embodiment as disclosed herein. For changing the bearer type from MN terminated bearer to a SN terminated bearer, the various steps performed by the MN 100 are shown in the flow chart 400h.

At step 402h, the method includes determining a change in the security key associated with the configured radio bearer due to PDCP termination point relocation. The method allows the MN 100 to determine the change in the security key associated with the PDCP entity of the configured bearer due to PDCP termination point relocation.

At step 404h, the method includes transmitting a SN modification request message including the bearer type change from the MN terminated bearer to a SN terminated bearer and SCG configuration information to the SN 200. The method allows the MN 100 to transmit the bearer type change from the MN terminated bearer to a SN terminated bearer and SCG configuration information to the SN 200.

At step 406h, the method includes receiving a SN modification acknowledgement message including a new SCG configuration with a PDCP reestablish indication and a security key change indication from the SN 200. The method allows the MN 100 to receive the SN modification acknowledgement message including the SCG configuration with a PDCP reestablish indication and a security key change indication from the SN 200.

At step 408h, the method includes transmitting a RRC reconfiguration message including new configuration information to the UE for realizing the bearer type change. The method allows the MN 100 to transmit the RRC reconfiguration message including new configuration information to the UE for realizing the bearer type change. The new configuration information indicates the UE to perform one or more operations.

In an embodiment, the new configuration information indicates the UE to reestablish the PDCP entity and to apply the security key change. the new configuration information indicates the UE that if the MN is LTE eNB, first reestablish the RLC entity associated with the MCG MAC entity and then to release the RLC entity and the corresponding logical channel. Else, if the MN is NR gNB, then release the RLC entity associated with the MCG MAC entity and the corresponding logical channel The new configuration information indicates the UE to reestablish a RLC entity associated with the SCG MAC entity and to associate the configured logical channel with the SCG MAC entity. Further, the new configuration information indicates the UE, not to reset MCG MAC entity if the logical channel identifier (LCID) of the logical channel associating the RLC entity with SCG MAC entity is different than the LCID of the released logical channel.

The various actions, acts, blocks, steps, or the like in the flow chart 400h may be performed in the order presented, in a different order or simultaneously. Further, in some embodiments, some of the actions, acts, blocks, steps, or the like may be omitted, added, modified, skipped, or the like without departing from the scope of the invention.

Figure 4I:
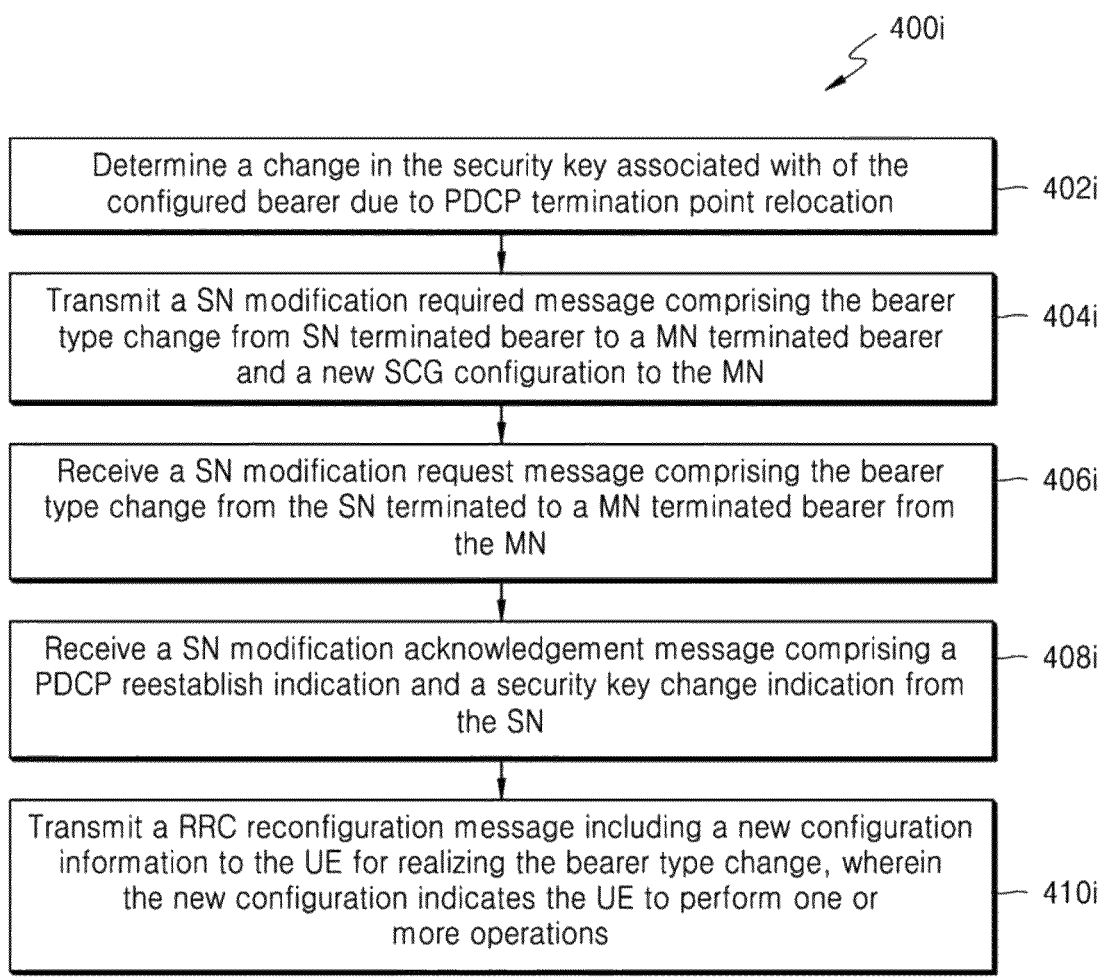
FIG. 4I is a flow chart illustrating various steps for performing bearer type change from a SN terminated bearer to a MN terminated bearer, according to an embodiment as disclosed herein.

FIG. 4I is a flow chart illustrating various steps for performing bearer type change from a SN terminated bearer to a MN terminated bearer, according to an embodiment as disclosed herein. For changing the bearer type from SN terminated bearer to a MN terminated bearer, the various steps performed are shown in the flow chart 400i.

At step 402i, the method includes determining a change in the security key associated with the configured radio bearer due to PDCP termination point relocation. The method allows the MN 100 or SN 200 to determine the change in the security key associated with the PDCP entity of the configured bearer due to PDCP termination point relocation.

At step 404i, the method includes transmitting a SN modification required message comprising the bearer type change from SN terminated bearer to a MN terminated bearer and a new SCG configuration to the MN 100. The method allows the SN 200 to transmit the a SN modification required message comprising the bearer type change from SN terminated bearer to a MN terminated bearer to the MN 100.

At step 406i, the method includes receiving a SN modification request message comprising the bearer type change from the SN terminated bearer to a MN terminated bearer from the MN 100. The method allows the SN 200 to receive the SN modification request message comprising the bearer type change from the SN terminated to a MN terminated bearer and SCG configuration information from the MN 100.

At step 408i, the method includes receiving a SN modification acknowledgement message comprising a PDCP reestablish indication and a security key change indication from the SN 200. The method allows the MN 100 to receive a SN modification acknowledgement message comprising SCG configuration with a PDCP reestablish indication and a security key change indication from the SN 200.

At step 410i, the method includes transmitting a RRC reconfiguration message including new configuration information to the UE for realizing the bearer type change. The method allows the MN 100 to transmit the RRC reconfiguration message including the new configuration information to the UE for realizing the bearer type change. The new configuration information indicates the UE to perform one or more operations.

In an embodiment, the new configuration information indicates the UE to reestablish the PDCP entity and to apply the security key change.

The new configuration information indicates the UE that when the SN is NR gNB, release the RLC entity associated with the SCG MAC entity and the corresponding logical channel. Else, if the SN is LTE eNB, first reestablish the RLC entity associated with the SCG MAC entity and then release the RLC entity and the corresponding logical channel.

Further, the new configuration information indicates the UE to reestablish the RLC entity associated with the MCG MAC entity and associate the configured logical channel with the MCG MAC entity. Furthermore, the new configuration information indicates the UE not to reset SCG MAC entity if the logical channel identifier (LCID) of the logical channel associating the RLC entity with MCG MAC entity is different than the LCID of the released logical channel.

The various actions, acts, blocks, steps, or the like in the flow chart 400i may be performed in the order presented, in a different order or simultaneously. Further, in some embodiments, some of the actions, acts, blocks, steps, or the like may be omitted, added, modified, skipped, or the like without departing from the scope of the invention.

It should be noted that the bearer type change from MCG DRB (NR PDCP configured) to/from MCG Split DRB and SCG DRB to/from SCG Split DRB does not involve the PDCP anchor point change in the network. Since the security key is same during these bearer type changes the PDCP is not re-established during these bearer type changes but PDCP recovery procedure may be triggered for the bearer type change from split DRB to MCG/SCG DRB. The security key is not changed since there is no change of the PDCP anchor point it involves transmitting the signaling message including the control information to the UE. The control information does not includes one of the PDCP re-establish indication and the security key change indication in response to the bearer type change in the network for the PDCP entity associated with MCG DRB when reconfigured as MCG split DRB and vice-versa. Same is case for SCG DRB reconfiguration to SCG Split DRB and vice-versa.

Further, the bearer type change between MCG to/from MCG split bearer or SCG to/from SCG split bearer can happen through Secondary Node Addition procedure or Secondary Node Modification procedure initiated through MN or SN. The Secondary Node Modification procedure may be initiated either by the MeNB or by the SgNB and be used to modify, establish or release bearer contexts, to transfer bearer contexts to and from the SgNB or to modify other properties of the UE context within the same SgNB. The MeNB uses the SN Modification procedure procedure to initiate configuration changes of the SCG within the same SgNB, e.g the addition, modification or release of SCG bearer(s) and the SCG part of MCG split and SCG split bearer(s). MeNB may not use the procedure to initiate the addition, modification or release of SCG SCells. The SeNB may reject the request, except if it concerns the release of SCG bearer(s) or the SCG part of MCG split bearer(s) and SCG split bearer(s). The SgNB uses the Secondary Node Modification procedure to perform configuration changes of the SCG within the same SgNB, e.g. to trigger the release of SCG SCell(s) (other than PSCell), bearer type change like SCG bearer(s) and the SCG part of MGC split bearer(s) and SCG split bearer(s) (upon which the MeNB may release the bearer or reconfigure it to an MCG bearer), and to trigger PSCell change. The MeNB cannot reject the release request of SCG SCells (other than PSCell), SCG bearer and the SCG part of MCG split bearer and SCG split bearer.

Figure 5:
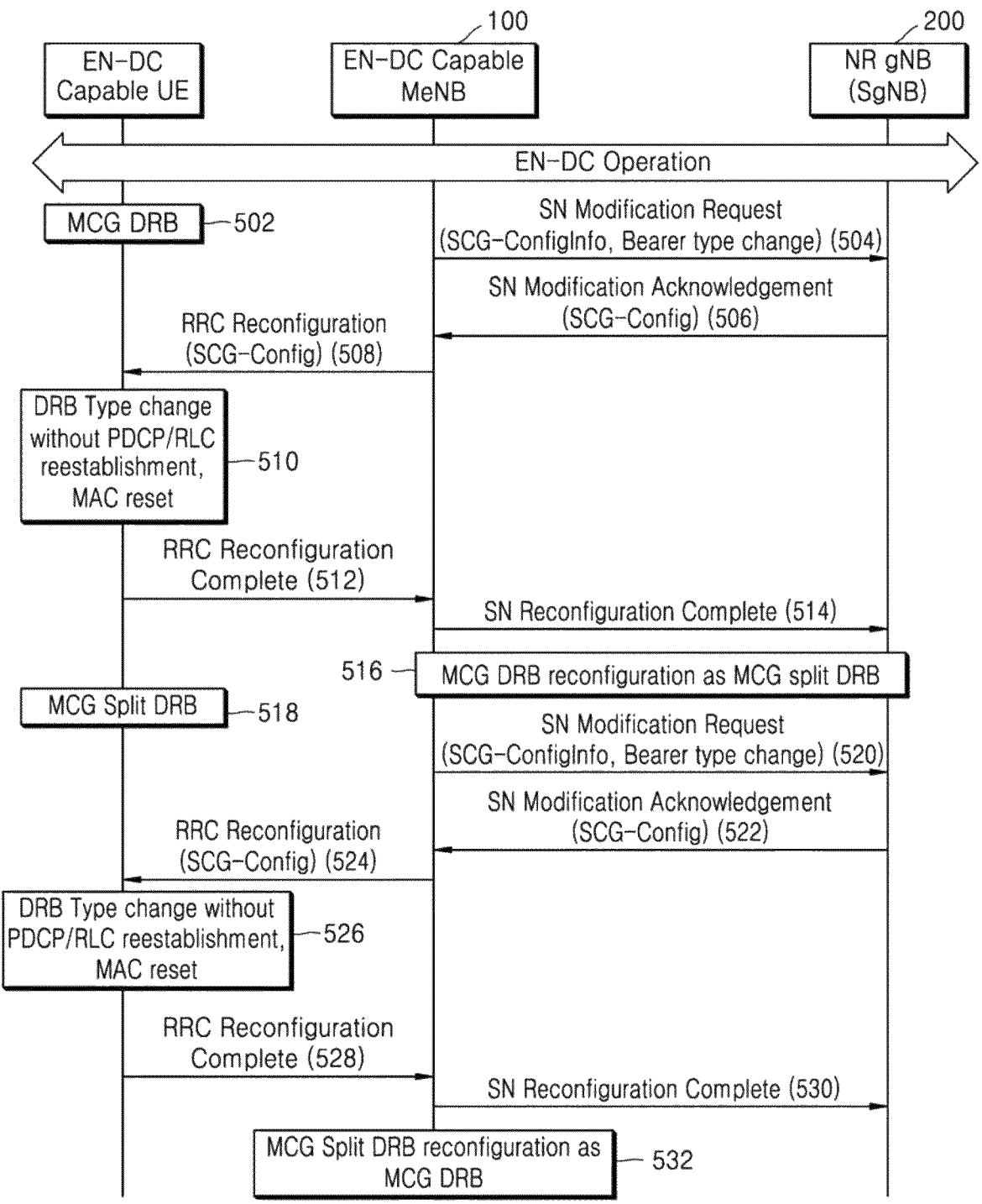
FIG. 5 illustrates a sequence diagram illustrating various steps involved during bearer type change between MCG to/from MCG split bearer, according to an embodiment as disclosed herein.

FIG. 5 illustrates signaling flow procedure for bearer type change between MCG to/from MCG split bearer in EN-DC operation. The same is applicable for other MR-DC operation or NR-NR DC operation. The UE is configured with EN-DC operation and initially configured (502) with MCG bearer. The various steps involved in bearer type change is as described below 1. The MeNB 100 sends (504) the SgNB (SN) 200, a Modification Request message, which contain bearer context related (bearer type change for MCG to MCG split bearer) and the requested SCG configuration information, including the UE capability coordination result to be used as basis for the reconfiguration by the SgNB.
2. The SgNB 200 responds (506) with the SgNB Modification Request Acknowledge message, which may contain SCG radio resource configuration information within a NR RRC configuration message.
3. The MeNB 100 initiates (508) the RRC connection reconfiguration procedure, including the NR RRC configuration message, This message contains bearer type change information from MCG to MCG split without mobilityconrolinfo (handover) or mobilitycontrolinfoSCG (SCG change) procedure.
4. The UE applies the new configuration and performs (510) bearer type change procedure from MCG to MCG split without impacting the other configured bearers. In this case UE will not re-establish the PDCP/RLC entity of configured bearers and reset the MAC as procedure is initiated without handover and SCG change procedure.
5. The UE performs bearer type change and responds (512) with RRC Connection Reconfiguration Complete, including a NR RRC response message. In case the UE is unable to comply with (part of) the configuration included in the RRCConnectionReconfiguration message, it performs the reconfiguration failure procedure.
6. Upon successful completion of the reconfiguration, the success of the procedure is indicated (514) in the SeNB Reconfiguration Complete message. The UE is reconfigured (516) with MCG split bearer and data transfer (518) is happening through both MN and SN link. In case NW (i.e., MN 100 or SN 200) wants to convert the MCG split bearer to MCG bearer then this can be either initiated by MeNB 100 or SgNB 200. The SgNB 200 cannot request to release the last split bearer if that would result in no bearers in SgNB. As shown in FIG. 5, the various steps involved is as mentioned below
7. The MeNB 100 sends (520) the SgNB Modification Request message, which contain bearer context related (bearer type change for MCG to MCG split bearer) and the requested SCG configuration information, including the UE capability coordination result to be used as basis for the reconfiguration by the SgNB.
8. The SgNB 200 responds (522) with the SgNB Modification Request Acknowledge message, which may contain SCG radio resource configuration information within a NR RRC configuration message.
9. The MeNB 100 initiates (524) the RRC connection reconfiguration procedure, including the NR RRC configuration message, This message contains bearer type change information from MCG split to MCG without mobility conrol info (handover) or mobility control infoSCG (SCG change) procedure.

10. The UE applies (526) the new configuration and performs bearer type change procedure from MCG split to MCG without impacting the other configured bearers. In this case UE will not re-establish the PDCP/RLC entity of configured bearers and resets the MAC as procedure is initiated without handover and SCG change procedure.

11. The UE performs bearer type change and responds (528) with RRC Connection Reconfiguration Complete, including a NR RRC response message.

12. Upon successful completion of the reconfiguration, the success of the procedure is indicated (530) in the SeNB Reconfiguration Complete message. Thus, the MCG Split DRB is reconfigured (532) as MCG DRB.

Figure 6:
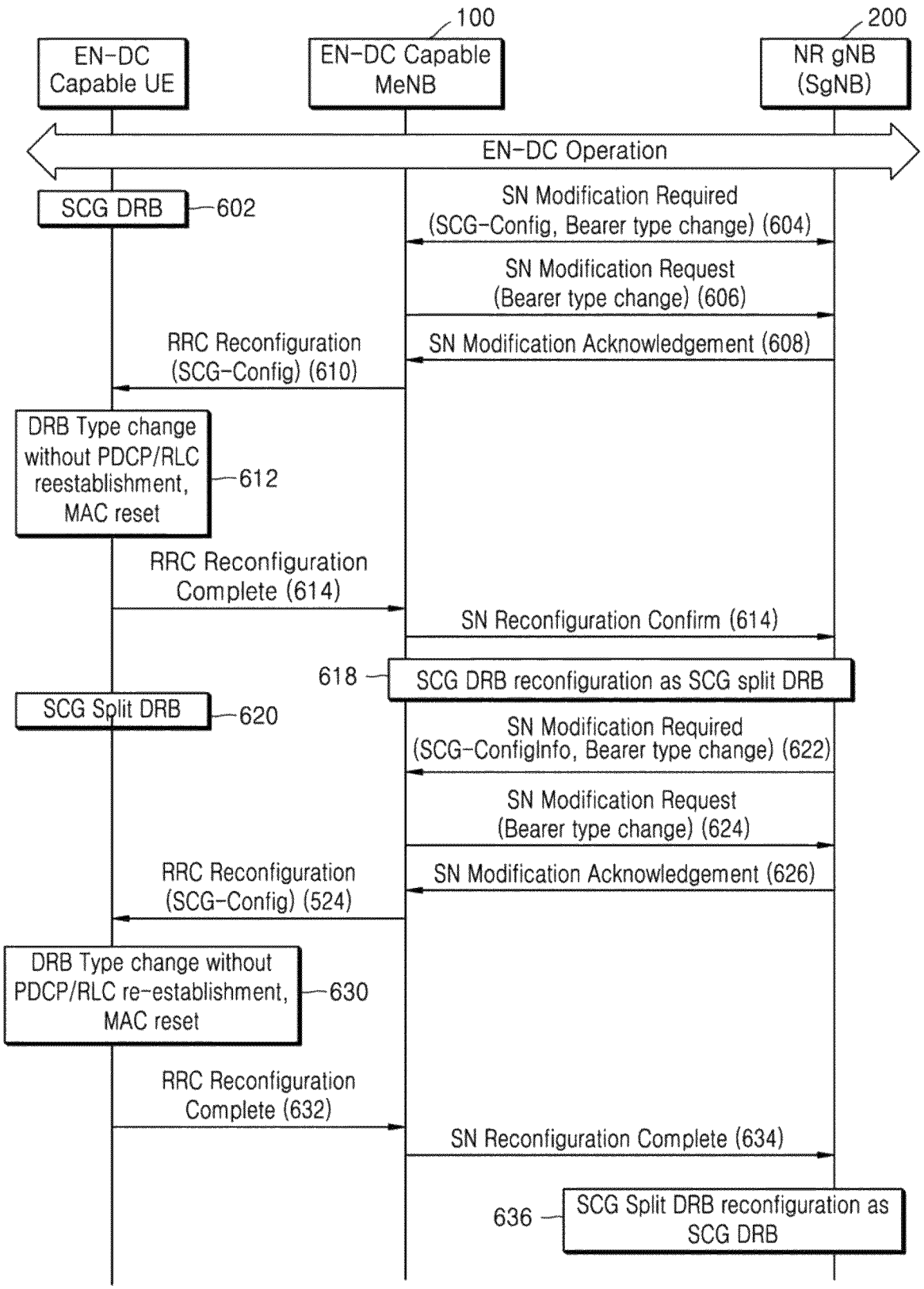
FIG. 6 illustrates sequence diagram illustrating various steps involved during bearer type change between SCG to/from SCG split bearer, according to an embodiment as disclosed herein.

FIG. 6 illustrates signaling flow procedure for bearer type change between SCG to/from SCG split bearer in EN-DC operation. The same is applicable for other MR-DC operation or NR-NR DC operation. The UE is configured with EN-DC operation and initially configured (602) with SCG bearer. The various steps involved in bearer type change is as described below.

The SgNB 200 sends (604) the SgNB (SN) Modification Required message including a NR RRC configuration message, which may contain bearer context related (bearer type change for SCG to SCG split bearer), other UE context related information and the new SCG radio resource configuration.

The MeNB 100 accepts the bearer type change requirement of the SgNB 200 by sending the SN Modification request message (606) to the SgNB. With the acceptance from the MeNB, the SgNB sends the SN modification acknowledgement message (608) to confirm the bearer type change from SCG bearer i.e. SN terminated bearer to SCG Split bearer i.e. SN terminated Split bearer.

The MeNB sends (610) the LTE RRCConnectionReconfiguration message including a NR RRC configuration message to the UE including the new SCG radio resource configuration. This message contains bearer type change information from SCG to SCG split without mobility conrol info (handover) or mobility control info SCG (SCG change) procedure. This message also carries MN DRB info for SCG split bearer. Alternatively, this message can also be initiated by SgNB 200, but in that case MeNB 100 needs to provide SeNB modification confirm message to SgNB 200.

The UE applies (612) the new configuration and performs bearer type change procedure from SCG to SCG split without impacting the other configured bearers. In this case, UE will not re-establish the PDCP/RLC entity of configured bearers and reset the MAC as procedure is initiated without handover and SCG change procedure.

The UE performs bearer type change and responds (614) with RRC Connection Reconfiguration Complete, including a NR RRC container. In case, the UE is unable to comply with (part of) the configuration included in the RRCConnectionReconfiguration message, it performs the reconfiguration failure procedure.

Upon successful completion of the reconfiguration, the success of the procedure is indicated (616) in the SeNB Reconfiguration Complete message. The UE is reconfigured (618) with SCG split bearer and data transfer is happening through both MN and SN link (620). In case NW wants to convert the SCG split bearer to SCG bearer then this can be either initiated by MeNB 100 or SgNB 200. As shown in FIG. 6, the various steps involved is as mentioned below.

The SgNB 200 sends (622) the SgNB Modification Required message including a NR RRC container, which may contain bearer context related (bearer type change for SCG split to SCG bearer), other UE context related information and the new SCG radio resource configuration. If the procedure was initiated by MeNB then, the MeNB 100 can also sends the SgNB Modification Request message, which contain bearer context related (bearer type change for SCG split to SCG bearer) and the requested SCG configuration information, including the UE capability coordination result to be used as basis for the reconfiguration by the SgNB.

The MeNB 100 accepts the bearer type change requirement of the SgNB 200 by sending the SN Modification request message (624) to the SgNB. With the acceptance from the MeNB, the SgNB sends the SN modification acknowledgement message (626) to confirm the bearer type change from SCG Split bearer i.e. SN terminated Split bearer to SCG bearer i.e. SN terminated bearer The MeNB 100 initiates (628) the RRC connection reconfiguration procedure, including the NR RRC container, release of MN part of DRB (i.e. lower part of Layer 2 configuration in MN) for SCG split bearer. This reconfiguration message contains bearer type change information from SCG split to SCG without mobility control info (i.e. realizing bearer type without handover procedure) or mobility control info SCG (i.e. realizing bearer type without SN/SCG change procedure).

The UE applies (630) the new configuration and performs bearer type change procedure from SCG split to SCG without impacting the other configured bearers. In this case, UE will not re-establish the PDCP/RLC entity of configured bearers and reset the MAC as procedure is initiated without handover and SCG change procedure.

The UE performs bearer type change and responds (632) with RRCConnection Reconfiguration Complete, including a NR RRC container. In case the UE is unable to comply with (part of) the configuration included in the RRCConnectionReconfiguration message, it performs the reconfiguration failure procedure. Upon successful completion of the reconfiguration, the success of the procedure is indicated (634) in the SeNB Reconfiguration Complete message. Thus, the SCG Split DRB is reconfigured as SCG DRB. (636)

Figure 7:
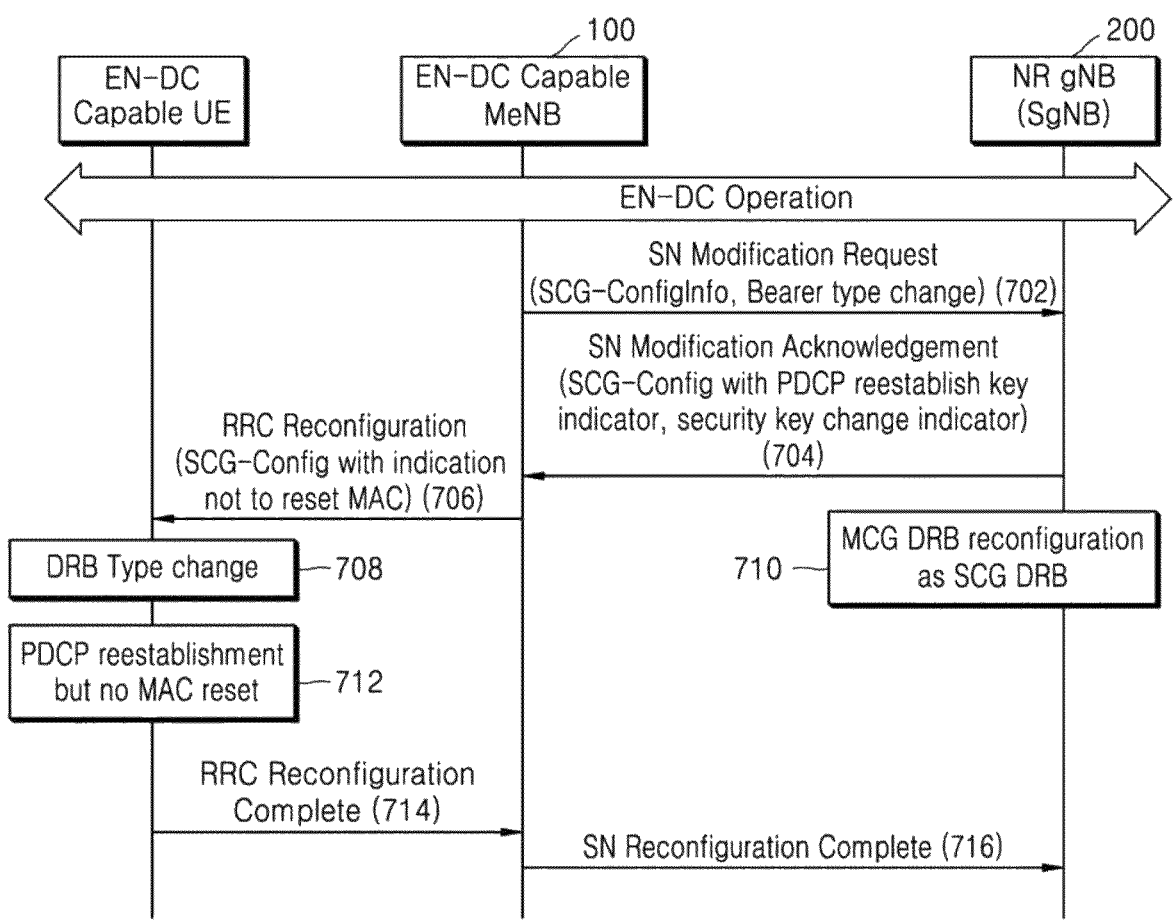
FIG. 7 illustrates a sequence diagram illustrating various steps of a SN modification procedure initiated by a Master Node for changing the bearer type from a MCG bearer to a SCG bearer, according to an embodiment as disclosed herein.

FIG. 7 illustrates a sequence diagram illustrating various steps of a SN modification procedure initiated by a Master Node for changing the bearer type from a MCG bearer to a SCG bearer, according to an embodiment as disclosed herein.

The bearer type change from MCG DRB (NR PDCP configured) to SCG DRB involves the PDCP anchor point in the network for the PDCP entity associated with the MCG DRB to be changed from the MN 100 to the SN 200 as shown in the FIG. 7. Since the security key used in the SN is different from the security key used in the MN 100, the change of the PDCP termination or anchor point involves transmitting the signaling message i.e. RRC reconfiguration including the mobility control information to the UE i.e. SCG-Config. The mobility control information i.e. SCG-Config includes one of the PDCP re-establish indication and the security key change indication in response to the change of the anchor point in the network for the PDCP entity associated with MCG DRB. The signaling message can be a RRC reconfiguration with SCG-Config or bearer type change message indicating that MCG MAC reset is not needed. The signaling message is triggered for bearer type change from MCG DRB to SCG DRB, wherein the MCG PDCP entity if configured as NR PDCP entity. EN-DC operation should support the one step (direct) bearer type change between MCG DRB to/from split DRB and MCG DRB to/from SCG DRB, when the MCG DRB is configured with NR PDCP.

As shown in FIG. 7, the MN 100 i.e., LTE eNB sends (702) the SN Modification Request message which includes the SCG-ConfigInfo basically indicating the bearer type change from MCG DRB to SCG DRB. The MN 100 sends the SN Modification Request message, which may contain bearer context related or other UE context related information, data forwarding address information (if applicable) and SCG-ConfigInfo which contains the MCG configuration, key change indication and the entire UE capabilities for UE capability coordination to be used as basis for the reconfiguration by the SN 200. The SN 200 i.e., NR gNB responds (704) with the SN Modification Request Acknowledge message, which may contain radio configuration information within SCG-Config message and data forwarding address information (if applicable). In this step 704, the SN 200 initiates the PDCP re-establishment indicator and the key change indicator i.e. the SCG-Config message indicates one of the PDCP re-establish indication and the security key change indication. The MN 100 shall continue sending DL PDCP PDUs to the SN 200 with the previous DL GTP TEID until it performs PDCP re-establishment or PDCP data recovery, and use the new DL GTP TEID starting with the PDCP re-establishment or data recovery. The MeNB sends (706) the RRCConnectionReconfiguration message including a NR RRC configuration message to the UE including the new SCG radio resource configuration.

The UE applies (708) the new configuration and performs bearer type change procedure from MCG DRB to SCG DRB. Further, at the SN 200 the MCG DRB is reconfigured (710) as SCG DRB. The UE performs (712) PDCP reestablishment and shall not perform reset of MAC entity. The UE performs bearer type change and responds (714) with RRC Connection Reconfiguration Complete. Upon successful completion of the reconfiguration, the success of the procedure is indicated (716) in the SeNB Reconfiguration Complete message.

Figure 8:
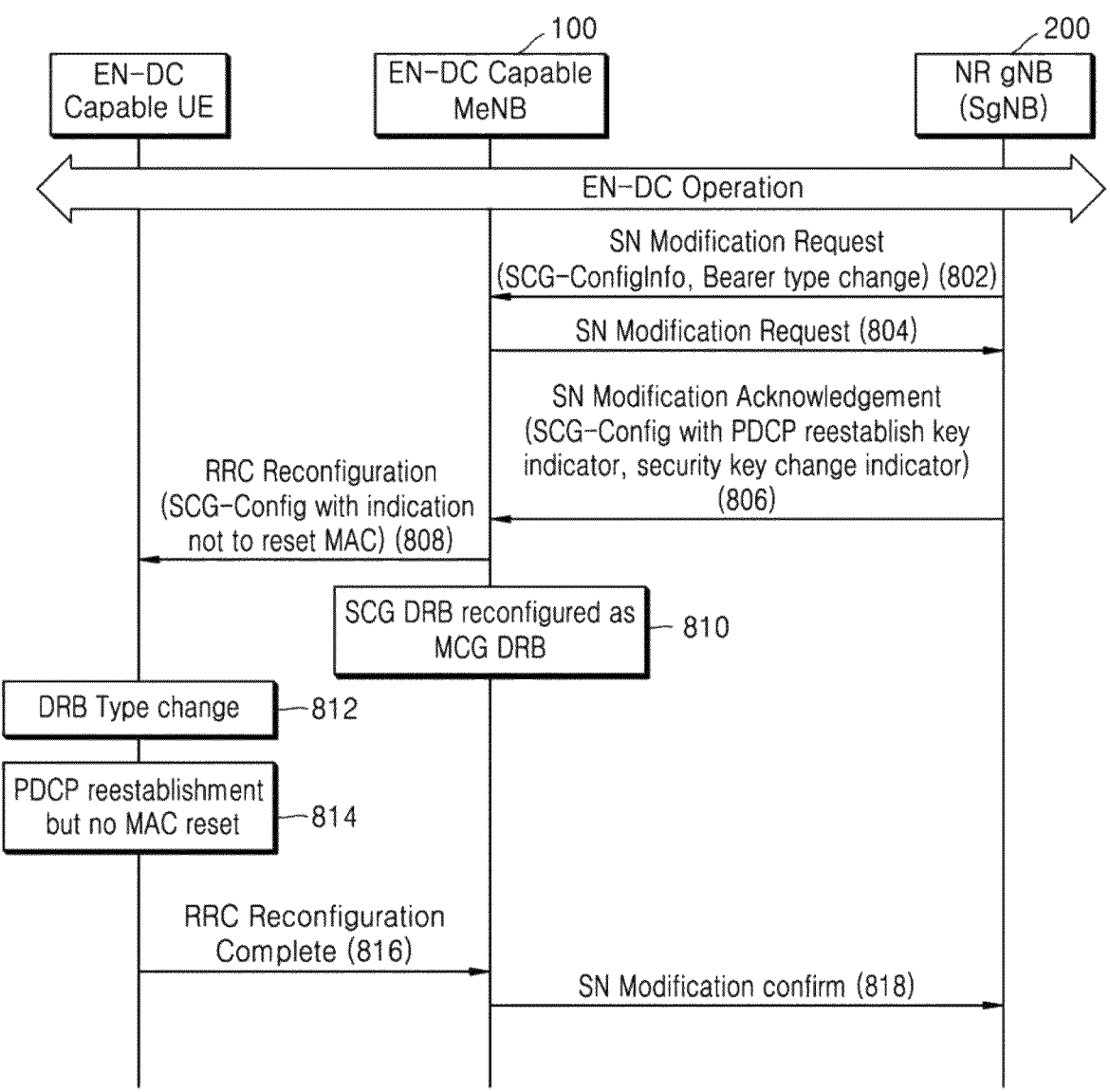
FIG. 8 illustrates a sequence diagram various steps of a SN modification procedure initiated by a Secondary Node for changing the bearer type from a SCG bearer to a MCG bearer, according to an embodiment as disclosed herein.

FIG. 8 illustrates a sequence diagram various steps of a SN modification procedure initiated by a Secondary Node for changing the bearer type from a SCG bearer to a MCG bearer, according to an embodiment as disclosed herein. The bearer type change from SCG DRB to MCG DRB (NR PDCP configured) involves the PDCP anchor point in the network for the PDCP entity associated with the SCG DRB to be changed from the SN 200 to the MN 100 as shown in FIG. 8. Since the security key used in the MN 100 is different from the security key used in the SN 200, the change of the PDCP anchor point involves transmitting the signaling message i.e. RRC reconfiguration including the mobility control information to the UE i.e., SCG-Config. The mobility control information i.e., SCG-Config includes one of the PDCP re-establish indication and the security key change indication in response to the change of the anchor point in the network for the PDCP entity associated with SCG DRB. The signaling message can be a RRC reconfiguration with SCG-Config or bearer type change message indicating that SCG MAC reset is not needed. The signaling message is triggered for bearer type change from SCG DRB to MCG DRB, wherein after reconfiguration the MCG PDCP entity is configured as NR PDCP entity. EN-DC operation should support the one step (direct) bearer type change between SCG DRB to MCG DRB, when the MCG DRB is configured with NR PDCP.

As shown in FIG. 8, the SN 200 i.e., NR gNB sends (802) the SN Modification Required message which may contain bearer context related, other UE context related information and SCG-Config which contains the new radio resource configuration of SCG. For bearer release or modification a corresponding E-RAB list is included in the SN Modification Required message i.e. bearer type change from SCG DRB to MCG DRB. In case of release of bearer served by SN, SCG-Config is not included. If data forwarding and/or security key change needs to be applied, the MN triggers the preparation of the MN initiated SN Modification procedure. The MN 100 i.e., LTE eNB sends (804) the SN Modification Request message which includes forwarding address and/or security key information. If the SN requested to release a SCG bearer, and the MN decides to reconfigure it to an MCG bearer, the MN provides the Key Change Indication within the SN Modification Request message and the SN 200 provides (806) respective RRC information in the SCG-Configuration within the SN Modification Request Acknowledgement message.

If MN 100 accepts the SN request, the MN 100 sends (808) the RRC Connection Reconfiguration message to the UE including the new radio resource configuration of SCG according to the SCG-Config i.e. indicates one of the PDCP re-establish indication, the security key change indication and not to reset the SCG MAC. The SCG DRB is reconfigured (810) as MCG DRB. The UE performs (812) the bearer type change and applies (814) the new configuration and replies (816) the RRC Connection Reconfiguration Complete message. Upon successful completion of the reconfiguration, the success of the procedure related to SCG-Config is indicated (818) to the SN 200 in the SN Modification Confirm message.

The Bearer type harmonization introduced unified bearer concept. To support Bearer type harmonisation RAN2 has agreed that the same PDCP protocol specification is used for DRBs for MCG split bearer, SCG split bearer and SCG bearer. For MCG bearer, RAN2 agreed either LTE PDCP or NR PDCP can be used as configured by the network.

In LTE-NR interworking it is agreed that network can configure each DRB to use 1 key out of a set of 2 keys (KeNB and S-KeNB derived as specified today). If NR PDCP is configured for MCG bearer then there is possibility that bearer type change between MCG to SCG may not involves key change and PDCP termination point change so there is no need to do PDCP kind of re-establishment procedure. EN-DC operation should support the one step (direct) bearer type change between MCG to/from SCG bearer without PDCP re-establishment kind procedure if NR PDCP is used for MCG bearer.

In LTE-DC bearer type change occurs either through handover (HO) or SN change procedure as a result L2 entities are re-establish and reset for all configured bearers. This is introduced to simplify the bearer type change procedure. Bearer type change through HO or SN change procedure always cause data loss or interruption in services for other configured bearer also as MAC entity is reset during such procedure.

If MCG bearer is configured with NR PDCP then bearer type change between MCG bearer to/from split bearer and MCG to/from SCG bearer does not involve change in PDCP termination point and PDCP version. Moreover it may or may not involve key change as DRB can use any 1 key out of a set of 2 keys. These bearer type changes can be supported without HO or SN change procedure. EN-DC operation should support a single reconfiguration procedure for bearer type change between MCG to/from split bearer and MCG to/from SCG bearer, when MCG bearer is configured with NR PDCP (before and after the bearer type change). EN-DC operation should support the one step (direct) bearer type change between MCG to/from SCG split bearer, SCG to/from MCG split bearer and MCG to/from SCG bearer without HO or SN change procedure.

Following Assumptions have been made for Table 1 which explains L2 handling MCG and SCG entities during bearer type changes.
  (i) In LTE-NR interworking UE support Security key per PDCP termination point i.e. 2 security keys; (ii) In EN-DC, some Bearer type change does not involve change in keys, PDCP version and PDCP termination point; (iii) LTE-NR DC should support the one step bearer type change between MCG bearers to/from split bearer if MCG bearer is configured with NR PDCP.

using the handover procedure. During SCG to SCG split bearer, UE should reconfigure the PDCP entity and establish an MCG RLC entity and an MCG DTCH logical channel in accordance with provided configuration.

During SCG split bearer to SCG bearer, MCG RLC entity associated with split bearer will be released, hence if MCG MAC has any data with old keys will automatically get discarded as corresponding logical channel will be released. Since the security key is same during these bearer type changes the PDCP is not re-established during these bearer type changes but PDCP recovery procedure will be triggered for the bearer type change from split DRB to SCG DRB. The EN-DC operation should support the one step (direct) bearer type change between SCG to/from SCG split bearer without using the handover procedure or SN change procedure.

TABLE 1

L2 handling during bearer type change

| | | | TO | | | | | |
|---|---|---|---|---|---|---|---|---|
| | | | MCG split bearer | | SCG bearer | | SCG spilt bearer | |
| FROM | MCG bearer | | MCG L2 entity | SCG L2 entity | MCG L2 entity | SCG L2 entity | MCG L2 entity | SCG L2 entity |
| | MCG L2 entity | SCG L2 entity | | | | | | |
| MCG bearer | N/A | | PDCP reordering | RLC establishment | PDCP re-stablishment | Reconfiguration of PDCP with SCG keys, RLC/MAC establishment | PDCP re-establishment RLC release | Reconfiguration of PDCP with SCG keys, SCG RLC/MAC establishment |
| | | | | | RLC release | | RLC re-establishment Reset MAC | |
| MCG split bearer | PDCP data recovery | RLC release | N/A | | Not supported | | FFS | |
| SCG bearer | Reconfiguration of PDCP with MCG keys, RLC establishment | PDCP re-establishment RLC release | Not supported | | N/A | | RLC establishment | PDCP reordering |
| SCG split bearer | Reconfiguration of PDCP with MCG keys, RLC re-establishment Reset MAC | PDCP re-establishment RLC release | FFS | | RLC release | PDCP data recovery | N/A | |

In the case of MCG to/from MCG split bearer there is no change in PDCP termination point or PDCP version change or keys change, then NW can support this DRB type change without any mobility procedure. There is no need to re-establish and reset the L2 entities when bearer type change occurs without mobility. During MCG to MCG split bearer, UE should reconfigure the PDCP entity and establish an SCG RLC entity and an SCG DTCH logical channel in accordance with provided configuration.

During MCG split bearer to MCG bearer, SCG RLC entity associated with split bearer will be released, hence if SCG MAC has any data with old keys will automatically get discarded as corresponding logical channel will be released. Since the security key is same during these bearer type changes the PDCP is not re-established during these bearer type changes but PDCP recovery procedure will be triggered for the bearer type change from split DRB to MCG DRB. The EN-DC operation should support the one step (direct) bearer type change between MCG to/from MCG split bearer without using the handover procedure.

In the case of SCG to/from SCG split bearer EN-DC operation should support the one step (direct) bearer type change between SCG to/from SCG split bearer without Bearer type change between MCG to/from SCG bearer can also happen through SCG bearer establishment as NW provides SCG counter during initial configuration of SCG security. When NW do SN addition or modification, it can change the bearer type from MCG to/from SCG. Bearer type change between MCG and SCG involves key change and PDCP termination point change so there is need of PDCP kind of re-establishment procedure for bearer change between MCG and SCG. EN-DC operation should support the one step (direct) bearer type change between MCG to/from SCG bearer with the PDCP re-establishment kind procedure without using the handover procedure or SN change procedure.

Figure 9:
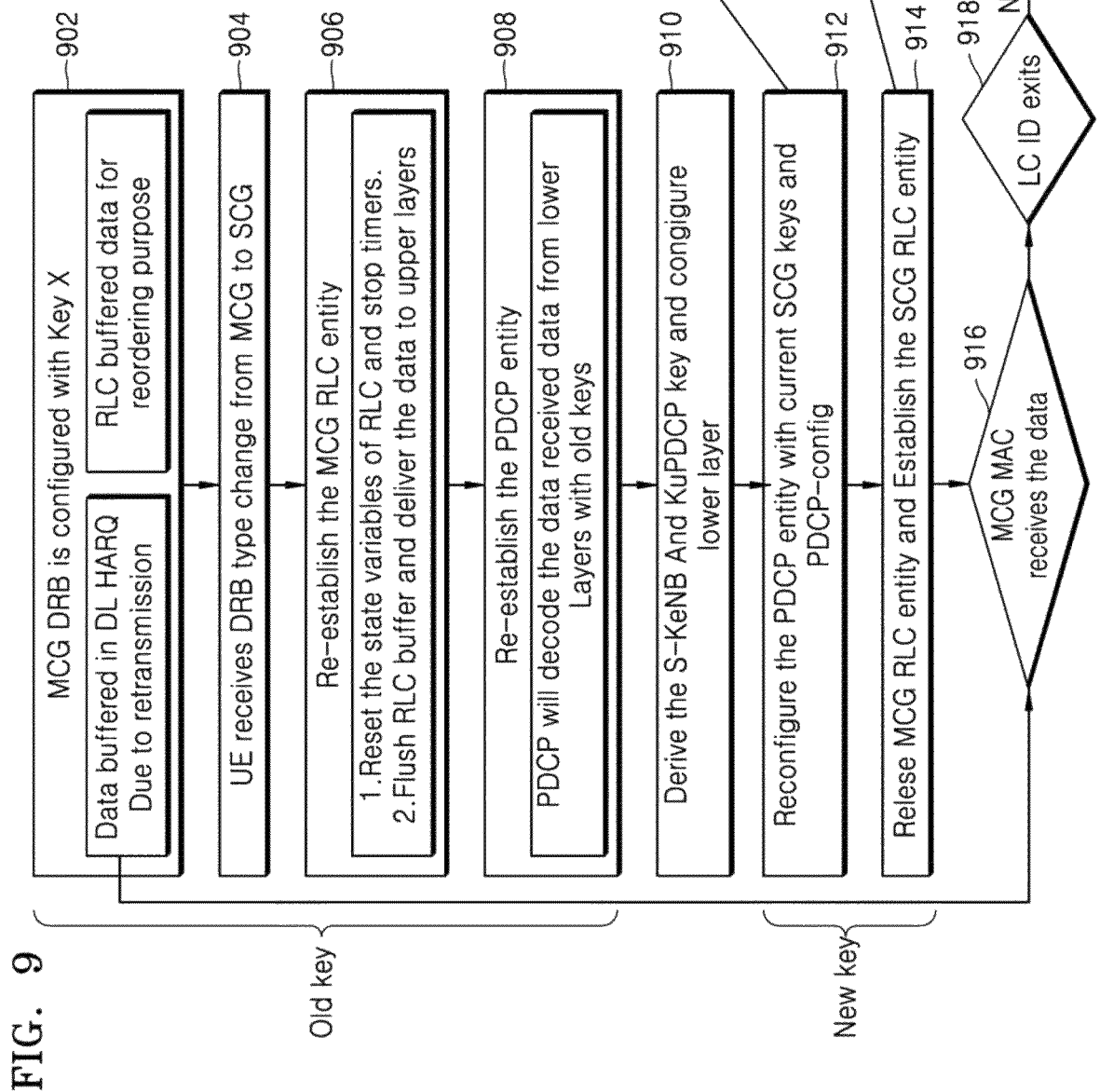
FIG. 9 illustrates stack behavior during bearer type change between MCG to/from SCG bearer, according to an embodiment as disclosed herein.

FIG. 9 illustrates stack behavior during bearer type change between MCG to/from SCG. During MCG to/from SCG bearer change there is no need to do MAC reset. In MCG to SCG DRB case when MCG RLC entity is reconfigure with SCG RLC entity then corresponding mapping between MCG RLC entity and MCG MAC will be released and new entity will be created between SCG RLC entity and SCG MAC entity. Once MCG MAC receives the data with old keys it will get discarded at MCG MAC so no need to reset the MCG MAC entity.

During MCG to SCG bearer change there will be change in RLC version also i.e. from LTE RLC to NR RLC for configured RLC entity. In LTE DC, this is simply done through reconfiguring the MCG RLC entity to SCG RLC entity as there is no change in RLC version, but in EN-DC during MCG to SCG bearer change, RLC entity version will also change from LTE to NR. The UE can do the following. At step 904, the UE receives MCG to/from SCG bearer change to handle RLC entity. At step 906, the UE performs MCG RLC re-establishment, then Release the MCG RLC entity and Establish the SCG RLC entity. This will ensure that UE will share all buffered packets with the PDCP entity; (ii) Release the MCG RLC entity and establish the SCG RLC entity. UE before releasing MCG RLC entity will ensure that it delivers the SDU to upper layer to avoid loss of data; (iii) MCG RLC re-establishment, Reconfigure the MCG RLC entity to SCG entity with new RLC configuration; (iv) Release the MCG/SCG RLC entity and establish the SCG/MCG RLC entity. This is mainly possible when the NR RLC (SCG to MCG bearer case) is used, NR RLC does not have buffering of a complete RLC SDU and so only a few segments are buffered in RX RLC buffer. Therefore, in this case, it does not need any data recovery procedure and just simple release seems sufficient. Text proposal in 36.300 or 36.331 or 38.300 or 38.331 or 38.xxx can be as below when MCG to SCG DRB type change happens without handover or SN change procedure.

there is a need to reset the MCG MAC entity. When the MAC entity is reset it will impact the data on other bearers also. This MAC reset can be avoided if it does not support direct bearer type change between MCG to/from SCG split bearer. This bearer type change can be supported through MCG to SCG change and then SCG to SCG split bearer. All this can be supported without mobility procedure.

In another embodiment, if the UE wants to support direct bearer type change between MCG to/from SCG split bearer then it is to be done with the PDCP re-establishment kind procedure without using the SN change procedure, at step 910. The PDCP is configured with new keys at step 912. In this case UE will do MAC reset. To avoid the same when NW is reconfiguring the bearer to SCG split bearer, it can change the logical channel ID for MCG RLC entity and can mapped the earlier MCG LCH ID to SCG LCH ID, so that mapping between MCG RLC entity and MCG MAC is deleted and with old logical channel new mapping is created between SCG RLC entity and SCG MAC. This way there is no need to reset the MCG MAC entity.

At step 916, the method includes receiving a MAC PDU. At step 918, the method includes identifying the one or more logical channels associated with the MAC PDU is not configured. At step 920, the method includes discarding sub-PDUs in the MAC PDU for the identified invalid values of logical channels and discarding the sub-PDUs not configured for the logical channels associated with the MAC PDU.

---

2> if the DRB indicated by drb-Identity is an SCG DRB:
   3> if drb-ToAddModList is received and includes the drb-Identity value, while for this
      entry drb-TypeChange is included and set to toMCG (i.e. SCG to MCG):
      4> Re-establish the MCG PDCP entity if bearer type change happen without
         handover or SN change
      4> reconfigure the PDCP entity with the current MCG security configuration and in
         accordance with the pdcp-Config, if included in drb-ToAddModList;
      4> release the SCG RLC entity and establish the MCG RLC entity
         or
      4> reconfigure the SCG RLC entity or entities and the SCG DTCH logical channel
         to be an MCG RLC entity or entities and an MCG DTCH logical channel;
      4> reconfigure the MCG RLC entity or entities and/ or the MCG DTCH logical
         channel in accordance with the rlc-Config, logicalChannelIdentity and
         logicalChannelConfig, if included in drb-ToAddModList;
   3> else (i.e. drb-Type is included and set to scg i.e. MCG to SCG):
      4> Re-establish the MCG PDCP entity if bearer type change happen without
         handover or SN change
      4 > reconfigure the PDCP entity with the current SCG security configuration and in
         accordance with the pdcp-Config, if included in drb-ToAddModListSCG;
4 >Re-establish the MCG RLC entity and reconfigure the MCG RLC entity or entities and the
MCG DTCH logical channel to be an:
      SCG RLC entity or entities and an SCG DTCH logical channel;
      4> reconfigure the SCG RLC entity or entities and/ or the SCG DTCH logical
         channel in accordance with the rlc-ConfigSCG, logicalChannelIdentitySCG and
         logicalChannelConfigSCG, if included in drb-ToAddModListSCG;
      Or
      4> release the MCG RLC entity and establish the SCG RLC entity . UE need to
         deliver the buffered data to upper layers before release.

---

In case MCG RLC entity is reconfigured to SCG RLC entity as both belongs to different RLC version, then state variable mapping is required between the two RLC entities. The variables used in LTE RLC and NR RLC are different During re-establishment all RLC variables are initialized to zero, so when reconfiguring the LTE RLC entity to NR RLC entity then UE should initialize the all NR state variables with the values as specified during RLC entity establishment in NR The same is true for NR to LTE RLC version change.

Figure 10:
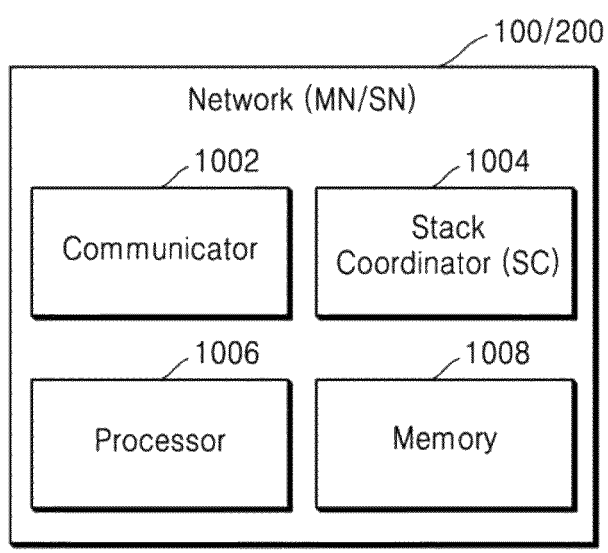
FIG. 10 illustrates various components of a network for performing the bearer type change, according to an embodiment as disclosed herein.

In case of MCG to/from SCG split bearer as mentioned in Table 1, when bearer type change occurs between MCG bearers to/from SCG split bearer then it involves key change as well as PDCP termination point change. As a result of this MCG MAC will have data with old set of keys. Due to this FIG. 10 illustrates various components of a network 100/200 for performing the bearer type change, according to an embodiment as disclosed herein. The network can be a MN 100 or a SN 200. The network 100/200 includes a communicator 1002, a stack coordinator (SC) 1004, a processor 1006 and a memory 1008.

Communicator 302 can be configured to transmit or receive radio signals from the UE. The communicator 302 includes a RF transceiver module (or dual RF modules), coupled with the antenna, receives RF signals from antenna, converts them to baseband signals and sends them to the processor 306.

The stack coordinator (SC) 304 can be configured to perform one or more actions on various entities of the protocol stack. In an embodiment, the SC 304 can be configured to transmit the RRC reconfiguration message with an indication during the SN change procedure. The indication can be generated by either MN 100 or SN 200 when split bearer is configured or when the bearer type change happens and is exchanged between the MN 100 and the SN 200.

During the bearer type change between split bearer to/from MCG or split bearer to/from split bearer, the UE can take action on SCG leg of split bearer but it cannot take action on L2 entities at LTE side. Thus, there is need of an explicit indication in RRC message which indicate whether LTE RLC re-establishment is needed or not. This will also trigger MAC reset procedure. This explicit indication is generated by either MN 100 or SN 200 when bearer type change happens. For EN-DC, during bearer type change procedure, LTE RRC reconfiguration or NR RRC reconfiguration message includes the explicit indication to re-establish the MCG and SCG RLC entity for radio bearer.

The indication transmitted in the RRC reconfiguration message includes one or more operations to be performed on a MN RLC entity, a SN RLC entity and a PDCP entity at the UE.

The processor 1006 (for example; a hardware unit, an apparatus, a Central Processing Unit (CPU), a Graphics Processing Unit (GPU), etc.,) communicatively coupled to a memory 1008 (e.g., a volatile memory and/or a non-volatile memory); the memory 1008 includes storage locations configured to be addressable through the processor 1006.

The processor 1006 may comprise the stack coordinator (SC) 1004 or perform the operations described above performed by the stack coordinator (SC) 1004. The memory 1008 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 1008 may, in some examples, be considered a non-transitory storage medium. The term "non-transitory" may indicate that the storage medium is not embodied in a carrier wave or a propagated signal. However, the term "non-transitory" should not be interpreted that the memory 1008 is non-movable. In some examples, the memory 1008 can be configured to store larger amounts of information than the memory. In certain examples, a non-transitory storage medium may store data that can, over time, change (e.g., in Random Access Memory (RAM) or cache).

Figure 11:
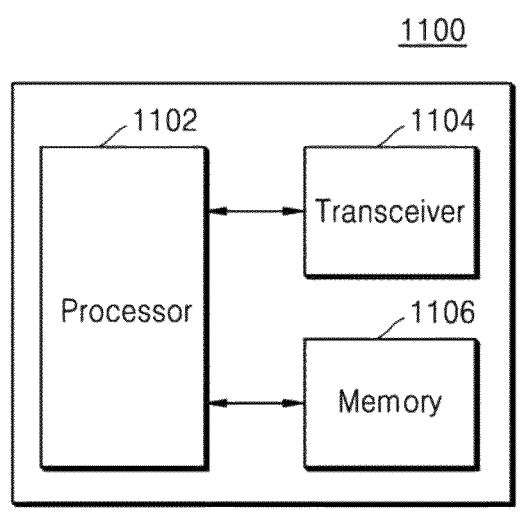
FIG. 11 illustrates the UE according to another embodiment of the present disclosure.

FIG. 11 illustrates the UE according to another embodiment of the present disclosure.

Referring to the FIG. 11, the UE 1100 may include a processor 1102, a transceiver 1104 and a memory 1106. However, all of the illustrated components are not essential. The UE 1100 may be implemented by more or less components than those illustrated in FIG. 11. In addition, the processor 1102 and the transceiver 1104 and the memory 1106 may be implemented as a single chip according to another embodiment.

The aforementioned components will now be described in detail.

The processor 1102 may include one or more processors or other processing devices that control the proposed function, process, and/or method. Operation of the UE 1100 may be implemented by the processor 1102.

The processor 1102 may detect a PDCCH on a configured control resource set. The processor 1102 determines a method for dividing CBs and a method for rate matching of a PDSCH according to the PDCCH. The processor 1102 may control the transceiver 1104 to receive the PDSCH according to the PDCCH. The processor 1102 may generate HARQ-ACK information according to the PDSCH. The processor 1102 may control the transceiver 1104 to transmit the HARQ-ACK information.

The transceiver 1104 may include a RF transmitter for up-converting and amplifying a transmitted signal, and a RF receiver for down-converting a frequency of a received signal. However, according to another embodiment, the transceiver 1104 may be implemented by more or less components than those illustrated in components.

The transceiver 1104 may be connected to the processor 1102 and transmit and/or receive a signal. The signal may include control information and data. In addition, the transceiver 1104 may receive the signal through a wireless channel and output the signal to the processor 1102. The transceiver 1104 may transmit a signal output from the processor 1102 through the wireless channel.

The memory 1106 may store the control information or the data included in a signal obtained by the UE 1100. The memory 1106 may be connected to the processor 1102 and store at least one instruction or a protocol or a parameter for the proposed function, process, and/or method. The memory 1106 may include read-only memory (ROM) and/or random access memory (RAM) and/or hard disk and/or CD-ROM and/or DVD and/or other storage devices.

Bearer type change with Mobility procedure: Another alternative is to always support bearer type change through mobility procedure. In EN-DC, if bearer type change occurs through handover or SN change, then UE needs to follow the same rule as applicable during handover or SN change for bearer type change as it may involves key change or PDCP anchor point change or PDCP version change. If Bearer type change happens through handover procedure then for MCG bearer, split bearer and SCG bearer, MCG/SCG PDCP/RLC should be re-established and MCG/SCG MAC should be reset. If Bearer type change happens through SN change procedure then SCG PDCP/RLC should be re-established, SCG MAC should be reset.

The bearer type change from MCG DRB to SCG DRB involves the PDCP anchor point in the network for the PDCP entity associated with the MCG DRB to be changed from the MN to the SN. Since the security key used in the SN is different from the security key used in the MN, the change of the PDCP anchor point involves transmitting the signaling message i.e. RRC reconfiguration including the mobility control information to the UE i.e. SCG-Config. So this bearer change should be handled with HO procedure or SN change procedure because PDCP anchor point changes, security key changes, PDCP re-establishment happens. EN-DC operation should support the one step (direct) bearer type change between MCG to/from SCG bearer through handover or SN change procedure. The mobility control information i.e. SCG-Config includes one of the PDCP re-establish indication and the security key change indication in response to the change of the anchor point in the network for the PDCP entity associated with MCG DRB. UE will perform PDCP re-establishment and RLC re-establishment and release procedure as mentioned above. MAC reset is not required during MCG to/from SCG bearer change but handover or SN change procedure will always cause MCG/SCG MAC reset which will impact the data on all configured bearers. To avoid the same we need to have some indication in RRC message during handover or SN change procedure which indicates not to reset the MAC entity during bearer type change between MCG to/from SCG bearer.

Bearer type change between MCG and SCG split bearer involves key change and PDCP termination point change so there is need of PDCP kind of re-establishment procedure. As mentioned in observation 3, MAC reset is required for bearer type change between MCG to/from SCG split bearer. To avoid the MAC reset, EN-DC operation should not support the one step (direct) bearer type change between MCG to/from SCG split bearer without mobility procedure. It should support two step bearer changes which involves MCG to SCG bearer type change and SCG bearer to SCG split bearer type change. EN-DC operation should support the one step (direct) bearer type change between MCG to/from SCG split bearer through handover or SN change procedure.

Bearer harmonization introduced unified bearer concept in LTE-NR interworking. MCG Split to/from SCG Split bearer type change may not occur in real networks because once the MN decides the location of the PDCP termination point for the split bearer this may not be changed very frequently. This bearer type change can be supported indirectly with two-step change if required for some reason from NW perspective. If the direct change is not supported then it will help to reduce the specification complexity and number of bearer type change options. EN-DC shall not support the direct type change between MCG split to/from SCG split bearer.

Another aspect is if UE wants to support this change then it can direct type change between MCG split to/from SCG split bearer through handover procedure as it involves change in keys and PDCP termination point. In case three keys concept is used i.e. keys per bearer type, then this transition can be transparent to the UE as there will no change in keys so there will be no impact on UE.

During MCG to/from MCG split bearer or SCG to/from Split bearer if there is change in keys or PDCP termination point then NW should always do this bearer type change through handover procedure only. The Table 2 explains L2 handling MCG and SCG entities during bearer type changes if Different key per bearer type—Three keys is configured in this case split bearer will be transparent to the UE. Possible bearer type changes are listed below All bearer type change need keys change although PDCP anchor does not change e.g. MCG to split bearer (Terminate at MN) as result PDCP/RLC re-establishment is needed and MAC reset is required. Few bearer type change required new procedure to support transition between bearer types. There is not much gain if we support bearer type change with and without mobility if separate keys are used per bearer as all transition will lead to L2 reset. To simplify procedure HO/SN change procedure is better option when separate keys are used for every bearer type. This procedure will cause data loss at other bearers also during bearer type change. In case we want to support bearer type change without mobility then we need to enhance the existing procedure to avoid SCG/MAC reset. This can be avoided through PDCP control PDU which indicates that when should receiver start decoding with new keys. NW need to provide new security keys in RRC reconfiguration message when split bearer is configured. In case it is UE is configured with Security key per bearer type then UE uses different key per bearer type i.e. three separate keys for MCG, SCG and Split bearers. In this case if both split bearer and SCG bearer keys derived from MN or MCG bearer then scope of SCG counter need to be enhanced and new counter split counter need to be introduced. NW need to ensure that range of both the counters associated with split bearer and SCG bearer should be different.

PDCP Version Change:

Bearer type harmonization introduced unified bearer concept and it allows greater deployment flexibility and to reduce the number of Bearer Type change options. As part of this feature the same PDCP protocol specification i.e. NR PDCP is used for DRBs for MCG split bearer, SCG split bearer and SCG bearer. For MCG bearer, either LTE PDCP or NR PDCP can be used as configured by the network. UE capable of supporting EN-DC operation during LTE standalone operation can be connected to LTE eNB which is either a legacy node or a Rel-15 LTE node. As per legacy LTE procedure during standalone operation LTE bearer is always configured with LTE PDCP. During mobility from legacy LTE to Rel-15 LTE, UE can be reconfigure with NR PDCP version, if UE is working in standalone operation. The reason is when EN-DC capable UE moves from LTE standalone operation to EN-DC operation, there is no need to do PDCP version change for the bearer which will minimize the complexity and restriction for bearer type

TABLE 2

L2 handling during bearer type change (3 keys)

| | | | From | | | |
|---|---|---|---|---|---|---|
| | MCG bearer | | Split bearer | | SCG bearer | |
| To | MCG entity | SCG entity | MCG entity | SCG entity | MCG entity | SCG entity |
| MCG bearer | N/A | | PDCP/RLC re-establishment Reset MAC | SCG RLC establishment/ MAC (if NC) | PDCP re-establishment RLC release MAC data will be automatically discarded | Reconfiguration of PDCP with SCG keys, SCG RLC/MAC establishment |
| Split bearer | N/A(UEwill get MCG keys only during HO. In case we want to support this, NW has to share the MCG keys without HO) | | N/A | | RLC release MAC data will be automatically discarded | Enhance the SCG counter PDCP/RLC re-establishment Rest MAC |
| SCG bearer | | | MCG RLC establishment | PDCP/RLC re-establishment Reset MAC | N/A | | change. This will help to support lossless transition during bearer type change as PDCP version will not change. In case of LTE standalone the LTE DRB for the EN-DC capable UE can be configured with NR PDCP version. This will help to have consistent UE behaviour and lossless Handover procedure without any restriction. When EN-DC capable UE moves from LTE standalone operation to EN-DC operation, the PDCP version change can happen from LTE PDCP to NR PDCP based on the NW decision. If the EN-DC UE is configured with a bearer which is carrying VOIP data then it is more suitable to use the LTE PDCP version of operation. This is because smaller PDCP SN size is used for VOIP packets which seem efficient. Further there is no motivation to change the MCG bearer carrying VOIP packets to any other bearer type. Therefore there is no benefit in changing the PDCP version of MCG bearers carrying VOIP packets during EN-DC operation. During EN-DC operation, the EN-DC capable UE should not undergo PDCP version change for MCG bearer configured with LTE PDCP when VOIP packets are carried by such bearer.

There can be following possible scenarios where PDCP version change can happen between NR PDCP and LTE PDCP for MCG bearer or standalone LTE bearer.

a. Inter RAT Handover can Cause PDCP Version Change in Below Cases
  When EN-DC capable UE moves from legacy LTE to Rel-15 LTE node for EN-DC operation i.e. MCG bearer PDCP version change can happen when such bearer configured with LTE PDCP is not carrying VOIP packets.
  When NGEN-DC capable UE moves between eLTE eNB connected to NextGen Core and NR gNB. In that case PDCP version change will happen b. PDCP Version Change During MR-DC Operation
  During MR-DC operation, NW can configure the MCG bearer either with LTE PDCP or NR PDCP Based on NW deployment or requirements it can change the PDCP version for MCG bearer between NR PDCP and LTE PDCP. One such case is for bearer type changes, if MCG DRB is configured with NR PDCP, then direct change between the bearer types can be supported without any complexity or restriction. If MCG DRB is configured as LTE PDCP then there can be impact on bearer type change as direct change between the bearer types e.g. MCG to SCG bearer or MCG to/from Split bearer need some additional restriction to support lossless transition.

c. Bearer Type Change
  During EN-DC or MR-DC operation bearer type change for below cases can lead to PDCP version change if MCG bearer is configured with LTE PDCP
  MCG to/from MCG Split bearer
  MCG to/from SCG operation
  MCG to/from SCG split bearer All the above mentioned scenarios can be supported through handover procedure as it involves PDCP version change and security key change which requires PDCP re-establishment. The scenarios a and b shall be supported through the handover procedure. Once UE moved to EN-DC operation the MCG bearer can be (not carrying VOIP packets) can be configured NR PDCP version through the handover procedure as it involves PDCP version change and security key change which requires PDCP re-establishment. Once a MCG bearer with NR PDCP version is available then scenario c bearer type changes can be supported efficiently with one-step procedure All the above mentioned scenarios can be supported through handover procedure as it involves PDCP version change and security key change which requires PDCP re-establishment. The scenarios a and b shall be supported through the handover procedure. Once UE moved to EN-DC operation the MCG bearer can be (not carrying VOIP packets) can be configured NR PDCP version through the handover procedure as it involves PDCP version change and security key change which requires PDCP re-establishment. Once a MCG bearer with NR PDCP version is available then scenario c bearer type changes can be supported efficiently with one-step procedure LTE PDCP and NR PDCP even though quite similar in terms of functionality, there are still some differences in terms of e.g. supported PDCP SN size, state variables, reordering functionality, PDCP PDU size etc. To support lossless PDCP version change in either direction few restrictions are required to achieve PDCP version change with the PDCP re-establishment procedure which does not result in data loss. In summary the difference between LTE and PDCP is as below shown in Table 3.

TABLE 3

| | LTE | NR |
|---|---|---|
| PDCP SN Size for SRB | 5 bits | 12 bits |
| PDCP SN Size for DRB | 7/12/15/18 bits | 12/18 bits |
| UP Integrity | Not supported | Supported |
| UL Duplication | Not supported | Supported |
| PDCP Variable | SN | COUNT |
| Maximum SDU | 8188 bytes | Up to jumbo frame (9 KB) |
| T-reordering | Only for split bearer | Always (by configuration) |

For bearer type changes under scenario c, if MCG DRB is configured with NR PDCP, then direct change between the bearer types can be supported without any complexity or restriction. If MCG DRB is configured as LTE PDCP then there can be impact on bearer type change as direct change between the bearer types e.g. MCG to SCG bearer or MCG to/from Split bearer need some additional restriction to support lossless transition. EN-DC operation should support the one step (direct) bearer type change between MCG to/from split bearer and MCG to/from SCG bearer, when MCG bearer is configured with NR PDCP. EN-DC operation where MCG bearer is configured with LTE PDCP, then direct bearer type change of such MCG bearer to split bearer or SCG bearer should not be supported.

PDCP version change for MCG bearer from LTE to/from NR PDCP can happen based on NW decision. When NW decides to do PDCP version change for MCG bearer it can trigger the same through handover procedure i.e. RRC reconfiguration message with mobility control info. This PDCP version change may or may not trigger key change but still as there is significant difference between LTE and NR PDCP protocol, there is need to perform PDCP and RLC re-establishment and reset the MAC to flush all the packets with old format. The handover procedure only for PDCP version change for MCG DRB is costly operation as it will impact the all configured bearers. So there is need to do some enhancements so that we can avoid the MAC reset or avoid triggering the RACH procedure so that there is less interruption time for user plane data. Few enhancements that can be proposed are listed below.

New parameters can be introduced in handover message which ensures that UE should not trigger the RACH procedure during PDCP version change like rach-Skip can be configured. This field indicates whether random access procedure for the target PCell is skipped. If the received RRCConnectionReconfiguration message includes the rach-Skip then configure lower layers to apply the rach-Skip for the target MCG.

Another thing is to avoid MAC reset, UE can allocate new logical channel or RLC entity during PDCP version change. This way it ensures that when MAC entity receives the packet with source PDCP version it will discard the same. Another way to avoid the MAC reset is to set the polling bit in PDCP data PDU which provides the indication to the NW that PDCP version change and it can except the packet with new PDU format. PDCP during re-establishment can also send the End marker packet which indicates that the receiver will receive the packets with new PDCP version The other method to change the PDCP version through Reconfiguration message without mobility control info. In this case NW can simply change the PDCP version of MCG bearer through DRB modification procedure or DRB addition or release procedure. In this case once UE found that PDCP version of MCG DRB have been changed through the indication in RRC reconfiguration message or based on presence of NR PDCP container for the configured MCG DRB or SRB, then it will do PDCP and RLC re-establishment and perform the partial MAC reset to flush the data with source version. Alternatively it can also send the PDCP end market packet during PDCP re-establishment, so that MAC reset is not required.

Another method is on getting RRC reconfiguration message for PDCP version change is to perform only PDCP re-establishment procedure. This is new kind of re-establishment procedure say re-establishment type 2. In this case LTE PDCP parameters will be mapped to NR PDCP parameters. As there is no change in LTE RLC and MAC, so these should not get impacted. Once UE completes the PDCP re-establishment procedure which involves mapping and delivering the packets to upper layers, it will send indication to the NW which indicates that now transmitter send the packet with new PDCP version. This can be achieved by sending either end marker packet which indicates that PDCP will send packet with new PDCP version or setting bit in PDCP data PDU or sending new PDCP control PDU. This kind of procedure will not impact the data on other configured bearers and there is no need to perform MAC reset Split bearer handling during Re-establishment procedure: Re-establishment procedure is used for re-establish the RRC connection, which involves the resumption of SRB1 operation, the re-activation of security and the configuration of only the PCell. The connection re-establishment succeeds only if the configured cell is prepared i.e. has a valid UE context. In case E-UTRAN accepts the re-establishment, SRB1 operation resumes while the operation of other radio bearers remains suspended. If AS security has not been activated, the UE does not initiate the procedure but instead moves to RRC_IDLE directly. In LTE DC On Reception of the RRCConnectionReestablishment by the UE, re-establish PDCP for SRB1; re-establish RLC for SRB1 and perform the radio resource configuration procedure in accordance with the received radioResourceConfigDedicated and resume SRB1;

In EN-DC split SRB concept is introduced which is used for reliability and improving performance. Split SRB can be used for SRB1 as well as SRB2. Consider split SRB (SRB1) is configured and re-establishment procedure has triggered. In this case UE will do the below as per existing procedure
1. Suspend all RBs except SRB0 "and send the re-establishment command.
2. Once UE receives RRCConnectionReestablishment, it will do below
   a. re-establish PDCP/RLC for SRB1;
   b. Reconfigure the RLC entity and logical channel config for SRB1;
   c. Resume the SRB1.

At the end of step 1, UE have suspended the SRB1 split bearer. In step 2a, UE will re-establish the MCG/SCG PDCP entity for Split SRB1. In step 2b, when UE has to reconfigure the RLC entity and logical channel config for SRB1, it does not have configuration for SCG leg of split SRB1 to reconfigure the split SRB1, as a result split SRB1 cannot be resumed at end of step 2c, so response of re-establishment procedure cannot be send. There is need to define the new behaviour to handle the split SRB1 during re-establishment procedure NW can change the change the "drb type" of SRB1 split bearer to SRB1 bearer i.e. remove the SCG leg of split bearer during RRCConnectionReestablishment procedure, Once UE removes the SCG leg of split SRB1 at step 2b, it can simply resume the SRB1 at the end of step 2c and send the response of re-establishment message Alternatively UE can suspend the split SRB functionality of SCG leg during re-establishment procedure and should only resume once SCG configuration is activated. Once UE receives the RRC Connection Reestablishment message, it should only resume the MCG leg of split SRB1 and resume the SCG leg of split SRB1, once it receives the SCG configuration in RRC reconfiguration message after re-establishment procedure is completed.

Another method is UE should release the SCG leg of split SRB1 during re-establishment procedure. Once re-establishment procedure is completed, if NW wants to configure the split SRB1, it can do the same by providing new configuration to the UE. The same methods are applicable for SCG SRB and Split SRB2 also as mentioned for split SRB1. UE can either suspend them or release the SCG leg of split SRB and SCG SRB during re-establishment procedure and resume it only once UE receives the configuration for SCG leg of split SRB2 or SCG SRB if suspended. Text proposal in 36.300 or 36.331 or 38.300 or 38.331 or 38.xxx can be as below when Re-establishment procedure is triggered.

---

5.3.7.2 or 5.xxx Initiation

---

The UE shall only initiate the procedure either when AS security has been activated or for a NB-IoT UE supporting RRC connection re-establishment for the Control Plane CIoT EPS optimisation. The UE initiates the procedure when one of the following conditions is met:

1> upon detecting radio link failure, in accordance with 5.3.11; or

1> upon handover failure, in accordance with 5.3.5.6; or

1> upon mobility from E-UTRA failure, in accordance with 5.4.3.5; or

1> upon integrity check failure indication from lower layers; or

1> upon an RRC connection reconfiguration failure, in accordance with 5.3.5.5;

| 5.3.7.2 or 5.xxx Initiation |
| --- |
| Upon initiation of the procedure, the UE shall:<br>   1> stop timer T310, if running;<br>   1> stop timer T312, if running;<br>   1> stop timer T313, if running;<br>   1> stop timer T307, if running;<br>   1> start timer T311;<br>   1> stop timer T370, if running;<br>   1> suspend all RBs except SRB0;<br>   1> reset MAC;<br>   2> release the SCG leg of split SRB (1 &2 ) and SCG SRB if configured,<br>      1>       release the MCG SCell(s), if configured, in accordance with 5.3.10.3a;<br>   1> apply the default physical channel configuration as specified in 9.2.4; |

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a user equipment (UE) comprising an evolved UMTS terrestrial radio access (E-UTRA) radio link control (RLC) entity and a new radio (NR) RLC entity configured with E-UTRA-NR dual connectivity (EN-DC) in a wireless communication system, the method comprising:
identifying information indicating to change a bearer type of a configured radio bearer for the UE, from a master cell group (MCG) RLC entity to a secondary cell group (SCG) RLC entity;
re-establishing the MCG RLC entity and releasing the MCG RLC entity; and
establishing the SCG RLC entity,
wherein the MCG RLC entity is associated with the E-UTRA RLC entity and the SCG RLC entity is associated with the NR RLC entity.

2. The method of claim 1, wherein a type of a bearer configured for the UE is changed from a master node (MN) terminated bearer to a secondary node (SN) terminated bearer with change of a packet data convergence protocol (PDCP) termination point, and
wherein a medium access control (MAC) entity corresponding to the SCG RLC entity is not reset.

3. A method performed by a user equipment (UE) comprising an evolved UMTS terrestrial radio access (E-UTRA) radio link control (RLC) entity and a new radio (NR) RLC entity, configured with E-UTRA-NR dual connectivity (EN-DC) in a wireless communication system, the method comprising:
identifying information indicating to change a bearer type of a configured radio bearer for the UE from a secondary cell group (SCG) RLC entity to a master cell group (MCG) RLC entity;
releasing the SCG RLC entity; and
establishing the MCG RLC entity,
wherein the MCG RLC entity is associated with the E-UTRA RLC entity and the SCG RLC entity is associated with the NR RLC entity.

4. A method performed by a user equipment (UE) comprising an evolved UMTS terrestrial radio access (E-UTRA) radio link control (RLC) entity and a new radio (NR) RLC entity, configured with E-UTRA-NR dual connectivity (EN-DC) in a wireless communication system, the method comprising:
identifying one or more information indicating to change a bearer type of a configured radio bearer for the UE from a split RLC entity to a master cell group (MCG) RLC entity; and
(i) reconfiguring a logical channel identity associated with a second RLC entity by re-establishing and reconfiguring the first RLC entity to the second RLC entity with a new RLC configuration, or (ii) reconfiguring the logical channel identity by releasing the first RLC entity and establishing the second RLC entity.

5. The method of claim 4, wherein a type of a bearer configured for the UE is changed from a master node (MN) terminated bearer to a secondary node (SN) terminated bearer with change of a packet data convergence protocol (PDCP) termination point, and
wherein a medium access control (MAC) entity corresponding to the second RLC entity is not reset.

6. The method of claim 4, further comprising:
reconfiguring the logical channel identity by re-establishing and reconfiguring the second RLC entity in a case where the second RLC entity is associated with an E-UTRAN node, and
reconfiguring the logical channel identity by releasing the first RLC entity and establishing the second RLC entity in a case where the second RLC entity is associated with an NR node.

* * * * *